US012568449B2

(12) United States Patent　　(10) Patent No.:　US 12,568,449 B2
Oh et al.　　　　　　　　　　　　 (45) Date of Patent:　　Mar. 3, 2026

(54) METHOD AND DEVICE FOR POWER CONTROL FOR MULTI-CONNECTIVITY IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Hyoungju Ji, Suwon-si (KR); Jinhyun Park, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 18/258,573

(22) PCT Filed: Nov. 2, 2021

(86) PCT No.: PCT/KR2021/015735
§ 371 (c)(1),
(2) Date: Jun. 21, 2023

(87) PCT Pub. No.: WO2022/139162
PCT Pub. Date: Jun. 30, 2022

(65) Prior Publication Data
US 2024/0049151 A1　　Feb. 8, 2024

(30) Foreign Application Priority Data

Dec. 23, 2020　　(KR) ........................ 10-2020-0182488

(51) Int. Cl.
*H04W 52/36*　　　 (2009.01)
*H04L 1/1812*　　　 (2023.01)
(Continued)

(52) U.S. Cl.
CPC ......... *H04W 52/367* (2013.01); *H04L 1/1812* (2013.01); *H04L 5/14* (2013.01);
(Continued)

(58) Field of Classification Search
CPC ............. H04W 52/367; H04W 52/146; H04W 52/40; H04W 76/15; H04L 1/1812; H04L 5/14
See application file for complete search history.

(56) References Cited

U.S. PATENT DOCUMENTS 12,035,246 B2 * 7/2024 Koorapaty .......... H04W 52/146
2014/0329551 A1 11/2014 Ryoo et al.
(Continued)

FOREIGN PATENT DOCUMENTS

KR　10-2015-0090688 A　　8/2015
KR　10-2015-0109848　　　10/2015
(Continued)

OTHER PUBLICATIONS

Supplementary European Search Report dated Apr. 24, 2024, in connection with European Patent Application No. 21911229.9, 8 pages.
(Continued)

*Primary Examiner* — Lester G Kincaid

(57) ABSTRACT
The present disclosure relates to a 5G or a pre-5G communication system to be provided to support a data transmission rate higher than that of a 4G communication system such as LTE. A method for performing an uplink power control for multi-connectivity in a wireless communication system may comprise the steps of: receiving, from a base station, cell group configuration information related to a master cell group (MCG) and one or more secondary cell groups (SCGs), among multiple cell groups configured for a terminal, wherein the cell group configuration information indicates each of maximum transmission power of the MCG
(Continued)

START

DETERMINE DC TYPE OF CELL GROUPS TO BE CONFIGURED FOR TERMINAL ~1305

TRANSMIT CELL GROUP CONFIGURATION INFORMATION INCLUDING MAXIMUM TRANSMISSION POWER OF MCG AND MAXIMUM TRANSMISSION POWER OF EACH SCG ~1310

DETERMINE TIME POINT AT WHICH EACH CELL GROUP IS ACTIVATED ~1315

RECEIVE UL SIGNALS TRANSMITTED VIA CELL GROUPS BY USING UL TX POWER OF MCG AND UL TX POWER OF EACH SCG ~1320

END and maximum transmission power of each of the SCGs; and transmitting, to the base station through the MCG and the SCGs, uplink signals having transmission power of the MCG and transmission power of each of the SCGs, determined according to the maximum transmission power of the MCG and the maximum transmission power of each of the SCGs and a multi-connectivity type of the multiple cell groups.

14 Claims, 12 Drawing Sheets

(51) Int. Cl.

| | | |
|---|---|---|
| *H04L 5/14* | (2006.01) | |
| *H04W 52/14* | (2009.01) | |
| *H04W 52/40* | (2009.01) | |
| *H04W 76/15* | (2018.01) | |

(52) U.S. Cl.
CPC ......... *H04W 52/146* (2013.01); *H04W 52/40* (2013.01); *H04W 76/15* (2018.02)

(56) References Cited

U.S. PATENT DOCUMENTS

| | | | |
|---|---|---|---|
| 2015/0215930 A1 | 7/2015 | Kim et al. | |
| 2015/0271761 A1 | 9/2015 | Park | |
| 2021/0007122 A1* | 1/2021 | Takeda | H04L 5/001 |
| 2022/0046522 A1 | 2/2022 | Kim et al. | |
| 2023/0141478 A1* | 5/2023 | Zhang | H04W 48/08 370/315 |
| 2023/0189167 A1* | 6/2023 | Nimbalker | H04W 52/346 |

FOREIGN PATENT DOCUMENTS

| | | |
|---|---|---|
| KR | 10-2020-0136860 | 12/2020 |
| KR | 10-2022-0017735 | 2/2022 |

OTHER PUBLICATIONS

Huawei, et al., "Discussion on impact of UL Power control mechanisms on EN-DC MOP test," R5-190605, 3GPP RAN5#4-5G-NR Adhoc, Singapore, Jan. 21-25, 2019, 4 pages.

Samsung, "Summary of NR UL power control—CA/DC aspects," R1-1809778, 3GPP TSG-RN WG1 Meeting #94, Gothenburg, Sweden, Aug. 20-24, 2018, 11 pages.

International Search Report and Written Opinion of the International Searching Authority dated Feb. 7, 2022, in connection with International Application No. PCT/KR2021/015735, 11 pages.

Samsung, "Uplink Power Control for NN-DC," R1-1910506, 3GPP TSG RAN WG1 98bis, Chongqing, China, Oct. 14-20, 2019, 4 pages.

NEC, "Correction to uplink power control in E-UTRA cells in EN-DC/NE-DC," R1-1910437, 3GPP TSG-RAN WG1 Meeting 98-bis, Chongqing, China, Oct. 14-20, 2019, 26 pages.

Request for the Submission of an Opinion dated Dec. 2, 2025, in connection with Korean Application No. 10-2020-0182488, 11 pages.

ETSI TS 138 213 V15.12.0 (Jan. 2021), 5G; NR; Physical layer procedures for control (3GPP TS 38.213 version 15.12.0 Release 15), Jan. 2021, 113 pages.

* cited by examiner

110

| 210 | 240 | 220 |
|---|---|---|

Wireless communication unit ◄──► Controller ◄──► Backhaul communication unit

↕

Storage unit ─230

METHOD AND DEVICE FOR POWER CONTROL FOR MULTI-CONNECTIVITY IN WIRELESS COMMUNICATION SYSTEM

CROSS-REFERENCE TO RELATED APPLICATIONS

This application is a U.S. National Phase Entry of PCT International Application No. PCT/KR2021/015735, which was filed on Nov. 2, 2021, and claims priority to Korean Patent Application No. 10-2020-0182488 which were filed in the Korean Intellectual Property Office on Dec. 23, 2020, the entire disclosures of each of which are incorporated herein by references.

TECHNICAL FIELD

The disclosure relates to a method and a device for controlling power of a user equipment during multi-connection in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G Network" communication system or a "post LTE" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

With the advance of wireless communication systems as described above, various services can be provided and wireless communication networks become complicated and diversified, and accordingly there is a need for technology to more efficiently transmit downlink and uplink channels.

DETAILED DESCRIPTION OF THE INVENTION

Technical Problem

Embodiments of the disclosure may provide a method and a device for controlling uplink transmission power in dual connectivity or multi-connectivity in which multiple cell groups are configured to a user equipment.

Embodiments of the disclosure may provide a method and a device for configuring transmission power for multiple cell groups in dual connectivity or multi-connectivity.

Embodiments of the disclosure may provide a method and a device for configuring uplink transmission power for multiple cell groups using different radio access technologies.

Embodiments of the disclosure may provide a method and a device for determining uplink transmission power of each cell group according to whether another cell group is activated, and activation/deactivation timing of another cell group.

Technical Solution

A method for performing uplink power control for multi-connectivity in a wireless communication system according to an embodiment of the disclosure may include receiving, from a base station, cell group configuration information related to a master cell group (MCG) and one or more secondary cell groups (SCGs) among multiple cell groups configured to a user equipment, wherein the cell group configuration information indicates each of a maximum transmission power of the MCG and a maximum transmission power of each of the SCGs, and transmitting, to the base station via the MCG and the SCGs, uplink signals having a transmission power of the MCG and a transmission power of each SCG, which are determined according to the maximum transmission power of the MCG and the maximum transmission power of each of the SCGs, and a multi-connectivity type of the multiple cell groups.

A method for performing uplink power control for multi-connectivity in a wireless communication system according to an embodiment of the disclosure may include transmitting, to a user equipment, cell group configuration information related to a master cell group (MCG) and one or more secondary cell groups (SCGs) among multiple cell groups configured to the user equipment, wherein the cell group configuration information indicates each of a maximum transmission power of the MCG and a maximum transmission power of each of the SCGs, and receiving, via the MCG and the SCGs, uplink signals transmitted from the user equipment with a transmission power of the MCG and a transmission power of each SCG, which are determined according to the maximum transmission power of the MCG and the maximum transmission power of each of the SCGs, and a multi-connectivity type of the multiple cell groups.

A user equipment device for performing uplink power control for multi-connectivity in a wireless communication system according to an embodiment of the disclosure may include a transceiver and a controller configured to control the transceiver, the transceiver being configured to receive, from a base station, cell group configuration information related to a master cell group (MCG) and one or more secondary cell groups (SCGs) among multiple cell groups configured to the user equipment, wherein the cell group configuration information indicates each of a maximum transmission power of the MCG and a maximum transmission power of each of the SCGs, and transmit, to the base station via the MCG and the SCGs, uplink signals having a transmission power of the MCG and a transmission power of each SCG, which are determined according to the maximum transmission power of the MCG and the maximum transmission power of each of the SCGs, and a multi-connectivity type of the multiple cell groups.

A base station device for performing uplink power control for multi-connectivity in a wireless communication system according to an embodiment of the disclosure may include a transceiver and a controller configured to control the transceiver, the transceiver being configured to transmit, to a user equipment, cell group configuration information related to a master cell group (MCG) and one or more secondary cell groups (SCGs) among multiple cell groups configured to the user equipment, wherein the cell group configuration information indicates each of a maximum transmission power of the MCG and a maximum transmission power of each of the SCGs, and receive, via the MCG and the SCGs, uplink signals transmitted from the user equipment with a transmission power of the MCG and a transmission power of each SCG, which are determined according to the maximum transmission power of the MCG and the maximum transmission power of each of the SCGs, and a multi-connectivity type of the multiple cell groups.

MODE FOR CARRYING OUT THE INVENTION

Figures 1, 2:
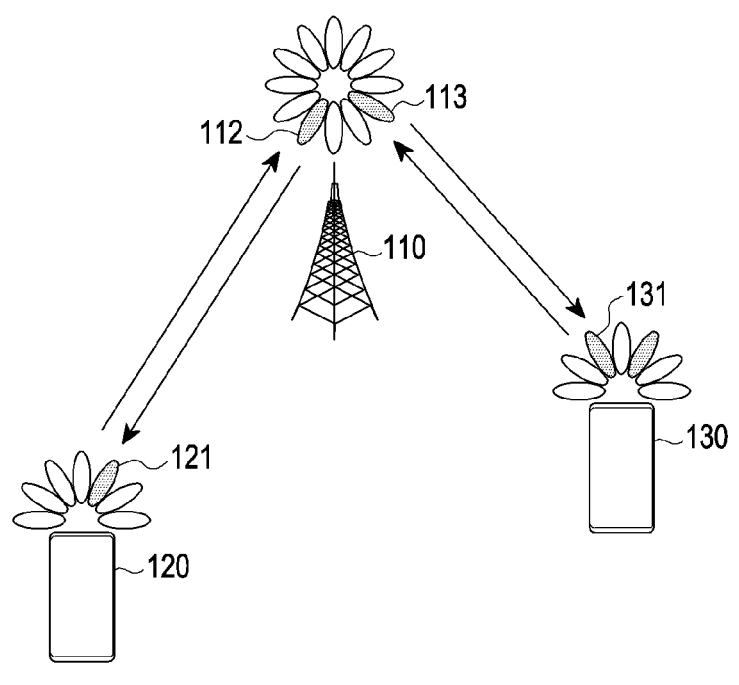
FIG. 1 is a diagram illustrating a wireless communication system according to an embodiment of the disclosure.
FIG. 2 is a diagram illustrating a configuration of a base station in the wireless communication system according to an embodiment of the disclosure.

Hereinafter, embodiments of the disclosure will be described in detail with reference to the accompanying drawings.

In describing the disclosure, descriptions related to technical contents well-known in the art and not associated directly with the disclosure will be omitted. Such an omission of unnecessary descriptions is intended to prevent obscuring of the main idea of the disclosure and more clearly transfer the main idea. Also, the terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to user equipments, and may be at least one of a gNode B, an eNode B, a Node B (or xNode B (where, x is an alphabet including one of g and e)), a wireless access unit, a base station controller, a satellite, an airborne, and a node on a network. A user equipment (UE) may include a mobile station (MS), a vehicular, a satellite, an airborne, a cellular phone, a smartphone, a computer, or a multimedia system capable of performing communication functions. In the disclosure, a "downlink (DL)" refers to a radio link via which a base station transmits a signal to a UE, and an "uplink (UL)" refers to a radio link via which a UE transmits a signal to a base station. Additionally, a "sidelink (SL)" may exist, which refers to a radio link via which a UE transmits a signal to another UE.

Furthermore, in the following description, LTE, LTE-A, or 5G systems may be described by way of example, but the embodiments of the disclosure may also be applied to other communication systems having similar technical backgrounds or channel types. For example, embodiments of the disclosure may also be applied to 5G-Advance, NR-Advance, or 6th generation (6G) mobile communication technologies developed beyond 5G mobile communication technologies (or new radio (NR)), and in the following description, the "5G" may be the concept that covers the exiting LTE, LTE-A, or other similar services. In addition, based on determinations by those skilled in the art, the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (generation Node B (gNB) or eNode B (eNB)), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a post-LTE communication system, that is, 5G communication system must freely reflect various requirements of users, service providers, and the like, services satisfying various requirements must be supported. The services considered in the 5G communication system may include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also requires a design for assigning a large number of resources in a frequency band in order to secure reliability of a communication link. However, the above-described mMTC, URLLC, and eBB are merely an example of different service types, and services types to which the disclosure is applied are not limited thereto.

The three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

FIG. 1 is a diagram illustrating a wireless communication system according to an embodiment of the disclosure. FIG. 1 illustrates a base station 110, a user equipment (UE) 120, and a UE 130, as parts of nodes using a radio channel in a wireless communication system. FIG. 1 illustrates only one base station as an example, but may further include another base station that is the same as or similar to the base station 110.

Referring to FIG. 1, the base station 110 may be a network infrastructure that provides radio access to the UEs 120 and 130. The base station 110 has coverage defined to be a predetermined geographic area, based on a distance over which a radio signal may be transmitted. The base station 110 may be referred to as an access point (AP), an eNodeB (eNB), a gNodeB (gNB), a 5th generation (5G) node, a wireless point, a transmission/reception point (TRP), or another term having an equivalent technical meaning.

Each of the UE 120 and the UE 130 is a device that may be used by a user, and may perform communication with the base station 110 via a radio channel. In some cases, at least one of the UE 120 and the UE 130 may be operated without involvement of a user. At least one of the UE 120 and the UE 130 is a device that performs machine type communication (MTC), and may not be carried by a user. Each of the UE 120 and the UE 130 may be referred to as a mobile station, a subscriber station, a remote UE, a wireless UE, a user device, a station (STA), or another term having an equivalent technical meaning.

The wireless communication environment may include wireless communication in an unlicensed band as well as a licensed band. The base station 110, the UE 120, and the UE 130 may transmit and receive radio signals in an unlicensed band (e.g., a band of 5 GHz to 7.125 GHz, or a band of $^{18}$~71 GHz). As an example, in an unlicensed band, a cellular communication system and another communication system (e.g., a wireless local area network (WLAN)) may coexist. The base station 110, the UE 120, and the UE 130 may perform a channel access procedure for an unlicensed band in order to guarantee fairness between two communication systems, that is, in order to prevent a channel being exclusively used by only one system. As an example of the channel access procedure in an unlicensed band, the base station 110, the UE 120, and the UE 130 may perform listen-before-talk (LBT).

The base station 110, the UE 120, and the UE 130 may transmit and receive radio signals in a millimeter wave (mmWave) band (e.g., 28 GHz, 30 GHz, 38 GHz, and 60 GHz). In this case, in order to improve channel gain, the base station 110, the UE 120, and the UE 130 may perform beamforming. Beamforming may include transmission beamforming and reception beamforming. The base station 110, the UE 120, and the UE 130 may assign directivity to a transmission signal or a reception signal. To this end, the base station 110 and the UEs 120 and 130 may select serving beams via a beam search procedure or a beam management procedure. After the serving beams are selected, communication may then be performed via resources that are in quasi co-located (QCL) relationships with resources in which the serving beams are transmitted.

The base station 110 may select at least one beam 112 and/or 113 in a specific direction. The base station 110 may communicate with the UE by using at least one beam 112 and/or 113 in a specific direction. For example, the base station 110 may receive a signal from the UE 120 or transmit a signal to the UE 120 by using the beam 112. The UE 120 may receive a signal from the base station 110 or transmit a signal to the base station 110 by using at least one beam 121. The base station 110 may receive a signal from the UE 130 or transmit a signal to the UE 130 by using the beam 113. The UE 130 may receive a signal from the base station 110 or transmit a signal to the base station 110 by using at least one beam 131.

FIG. 2 is a diagram illustrating a configuration of a base station in the wireless communication system according to an embodiment of the disclosure. The configuration illustrated in FIG. 2 may be understood as the configuration of the base station 110 in FIG. 1. The terms "-unit", "-device", etc. used hereinafter may refer to a unit configured to process at least one function or operation, and may be implemented as hardware, software, or a combination of hardware and software.

Referring to FIG. 2, the base station may include a wireless communication unit 210, a backhaul communication unit 220, a storage unit 230, and a controller 240.

The wireless communication unit 210 (which may be used interchangeably with a transceiver) may perform functions for transmitting and receiving signals via a radio channel. For example, the wireless communication unit 210 may perform conversion between a baseband signal and a bitstream according to a physical layer specification of the system. For example, when transmitting a signal, the wireless communication unit 210 may generate complex symbols by encoding and modulating a transmission bitstream. When receiving a signal, the wireless communication unit 210 may restore a transmission bitstream via demodulation and decoding of a received baseband signal.

The wireless communication unit 210 may up-convert a baseband signal into a radio frequency (RF) band signal and transmit the same through an antenna, and may down-convert an RF band signal received through an antenna into a baseband signal. To this end, the wireless communication unit 210 may include a transmission filter, a reception filter, an amplifier, a mixer, an oscillator, a digital-to-analog converter (DAC), an analog-to-digital converter (ADC), and the like. The wireless communication unit 210 may include multiple RF chains corresponding to multiple transmission or reception paths. Further, the wireless communication unit 210 may include at least one antenna array including multiple antenna elements.

In terms of hardware, the wireless communication unit 210 may include a digital unit and an analog unit, wherein the analog unit includes multiple sub-units according to an operation power, an operation frequency, and the like. The digital unit may be implemented as at least one processor (e.g., a digital signal processor (DSP)).

The wireless communication unit 210 may transmit and receive a signal as described above. Accordingly, all or a part of the wireless communication unit 210 may be referred to as a "transmitter", a "receiver", or a "transceiver". In the following description, transmission and reception performed via a radio channel are used in a sense including that the wireless communication unit 210 performs processing as described above. According to an embodiment, the wireless communication unit 210 may include at least one transceiver.

The backhaul communication unit 220 may provide an interface configured to perform communication with other nodes within a network. That is, the backhaul communication unit 220 may convert, into a physical signal, a bitstream transmitted from the base station to another node, for example, another access node, another base station, a higher node, a core network, etc., and may convert a physical signal received from another node into a bitstream.

The storage unit 230 may store data, such as a basic program, an application program, configuration information, and the like for operation of the base station. The storage unit 230 may include a volatile memory, a non-volatile memory, or a combination of a volatile memory and a non-volatile memory. The storage unit 230 may provide stored data in response to a request of the controller 240. According to an embodiment, the storage unit 230 may include at least one memory.

The controller 240 may control overall operations of the base station. For example, the controller 240 may transmit and receive a signal via the wireless communication unit 210 or the backhaul communication unit 220. The controller 240 may record and read data in the storage unit 230. The controller 240 may perform functions of a protocol stack required by communication standards. In an embodiment, the protocol stack may be included in the wireless communication unit 210. In an embodiment, the controller 240 may include at least one processor.

For example, the controller 240 may control other elements so that the base station performs operations according to at least one of various embodiments described below. For example, the controller 240 may perform a channel access procedure for an unlicensed band. For example, the transceiver (e.g., the wireless communication unit 210) may receive signals transmitted in an unlicensed band, and the controller 240 may compare a strength of the received signal, etc. with a threshold determined according to a function value that is predefined or has a bandwidth as a factor, in order to determine whether the unlicensed band is idle. For example, the controller 240 may transmit a control signal to the UE or receive a control signal from the UE via the transceiver. For example, the controller 240 may transmit data to the UE or receive data from the UE via the transceiver.

In an embodiment, the controller 240 may determine a transmission result for a signal transmitted to the UE, based on a control signal or a data signal received from the UE. The controller 240 may configure one piece of downlink control information (DCI) for assigning one or more data channels to one or more cells and transmit the DCI to the UE via the wireless communication unit 210. Before transmission of the DCI, the controller 240 may provide the UE with configuration information required to assign one or more data channels, by the one piece of DCI via higher-layer signaling. The controller 240 may transmit a data channel to the UE or receive a data channel from the UE, based on information fields included in the DCI and the configuration information.

In an embodiment, the controller 240 may maintain or change the length of a contention window (CW) (hereinafter, contention window adjustment) for a channel access procedure, based on a transmission result, i.e., based on a result of receiving a control signal or a data signal by the UE. According to an embodiment, the controller 240 may determine a reference duration in order to acquire a transmission result for contention window adjustment. The controller 240 may determine a data channel for contention window adjustment in the reference duration. The controller 240 may determine a reference control channel for contention window adjustment in the reference duration. If the unlicensed band is determined to be idle, the controller 240 may occupy the channel.

In an embodiment, the controller 240 may perform control to receive uplink control information (UCI) from the UE via the wireless communication unit 210 and identify whether retransmission is required and/or whether a change in a modulation and coding scheme is required for a downlink data channel via one or more pieces of hybrid automatic repeat request acknowledgment information (HARQ-ACK) and/or channel state information (CSI) included in the uplink control information. The controller 240 may perform control to generate downlink control information (DCI) for scheduling of initial transmission or retransmission of downlink data or requesting transmission of uplink control information, and to transmit the downlink control information to the UE via the wireless communication unit 210. The controller 240 may control the wireless communication unit 210 to receive (re)transmitted uplink data and/or uplink control information according to the downlink control information.

Figure 3:
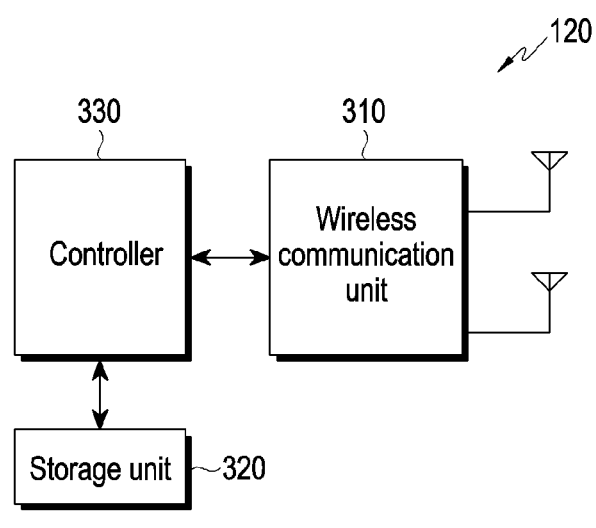
FIG. 3 is a diagram illustrating a configuration of a user equipment in the wireless communication system according to an embodiment of the disclosure.

FIG. 3 is a diagram illustrating a configuration of a UE in the wireless communication system according to an embodiment of the disclosure. The configuration illustrated in FIG. 3 may be understood as the configuration of the UE 120 of 130 of FIG. 1. The terms "-unit", "-device", etc. used hereinafter may refer to a unit configured to process at least one function or operation, and may be implemented as hardware, software, or a combination of hardware and software.

Referring to FIG. 3, the UE may include a communication unit 310, a storage unit 320, and a controller 330.

The wireless communication unit 310 (which may be used interchangeably with a transceiver) may perform functions for transmitting and receiving signals via a radio channel. For example, the wireless communication unit 310 may perform conversion between a baseband signal and a bitstream according to a physical layer specification of the system. For example, when transmitting a signal, the wireless communication unit 310 may generate complex symbols by encoding and modulating a transmission bitstream. When receiving a signal, the wireless communication unit 310 may restore a transmission bitstream via demodulation and decoding of a received baseband signal. The wireless communication unit 310 may up-convert a baseband signal into an RF band signal, transmit the up-converted RF band signal via an antenna, and then down-convert the RF band signal received via the antenna into a baseband signal. For example, the wireless communication unit 310 may include at least one of a transmission filter, a reception filter, an amplifier, a mixer, an oscillator, a DAC, and an ADC.

The wireless communication unit 310 may include multiple transmission/reception paths. The wireless communication unit 310 may include at least one antenna array including multiple antenna elements. In terms of hardware, the wireless communication unit 310 may include a digital unit and an analog unit (e.g., a radio frequency integrated circuit (RFIC)). Here, the digital unit and the analog unit may be implemented in a single package. The wireless communication unit 310 may include multiple RF chains.

The wireless communication unit 310 may include at least one antenna array including multiple antenna elements so as to perform beamforming.

The wireless communication unit 310 may transmit and receive a signal as described above. Accordingly, all or a part of the wireless communication unit 310 may be referred to as "transmitter", "receiver", or "transceiver". In the following description, transmission and reception performed via a radio channel are used in a sense including that the wireless communication unit 310 performs processing as described above. According to an embodiment, the wireless communication unit 310 may include at least one transceiver.

The storage unit 320 may store data, such as a basic program, an application program, configuration information, and the like for operation of the UE. The storage unit 320 may include a volatile memory, a non-volatile memory, or a combination of a volatile memory and a non-volatile memory. The storage unit 320 may provide stored data in response to a request of the controller 330. According to an embodiment, the storage unit 320 may include at least one memory.

The controller 330 may control overall operations of the UE. For example, the controller 330 may transmit and receive a signal via the wireless communication unit 310. The controller 330 records and reads data in the storage unit 320. The controller 330 may perform functions of a protocol stack required by communication standards. To this end, the controller 330 may include at least one processor or microprocessor, or may be a part of a processor. According to an embodiment, the controller 330 may include at least one processor. According to an embodiment, a part of the wireless communication unit 310 and/or the controller 330 may be referred to as a communication processor (CP).

The controller 330 may control other elements so that the UE performs operations according to at least one of various embodiments described below. For example, the controller 330 may receive a downlink link signal (a downlink control signal or downlink data) transmitted by the base station via the transceiver (e.g., the communication unit 310). For example, the controller 330 may determine a transmission result for a downlink signal. The transmission result may include an acknowledgment (ACK), a negative ACK (NACK), or discontinuous transmission (DTX), and the like, as feedback on the transmitted downlink signal. In the disclosure, the transmission result may also be referred to as various terms, such as a downlink signal reception state, a reception result, a decoding result, and HARQ-ACK information.

The controller 330 may transmit an uplink signal to the base station via the transceiver, as a response signal to the downlink signal. The uplink signal may explicitly or implicitly include the result of transmission of the downlink signal. In an embodiment, the controller 330 may include at least one of the HARQ-ACK information and/or channel state information (CSI) in the uplink control information so as to transmit the uplink control information to the base station via the wireless communication unit 310. In an embodiment, the uplink control information may be transmitted with the uplink data via the uplink data channel, or may be transmitted to the base station via the uplink data channel without uplink data.

The controller 330 may perform a channel access procedure for an unlicensed band. For example, the wireless communication unit 310 may receive signals transmitted in an unlicensed band, and the controller 330 may compare a strength of the received signal, etc. with a threshold determined according to a function value which is predefined or has a bandwidth as a factor, in order to determine whether the unlicensed band is idle. The controller 330 may perform an access procedure for the unlicensed band in order to transmit a signal to the base station. The controller 330 may determine an uplink transmission resource for transmission of uplink control information by using at least one of downlink control information received from the base station and a result of the channel access procedure, and may transmit the uplink control information to the base station via the transceiver.

The controller 330 may receive higher layer signaling including configuration information required to receive one piece of downlink control information (DCI) configured to assign one or more data channels to one or more cells, from the base station via the wireless communication unit 310. The controller 330 may also receive the DCI and interpret fields included in the DCI, based on the configuration information. The controller 330 may transmit a data channel to the base station or receive a data channel from the base station, based on information fields included in the DCI and the configuration information.

Figure 4:
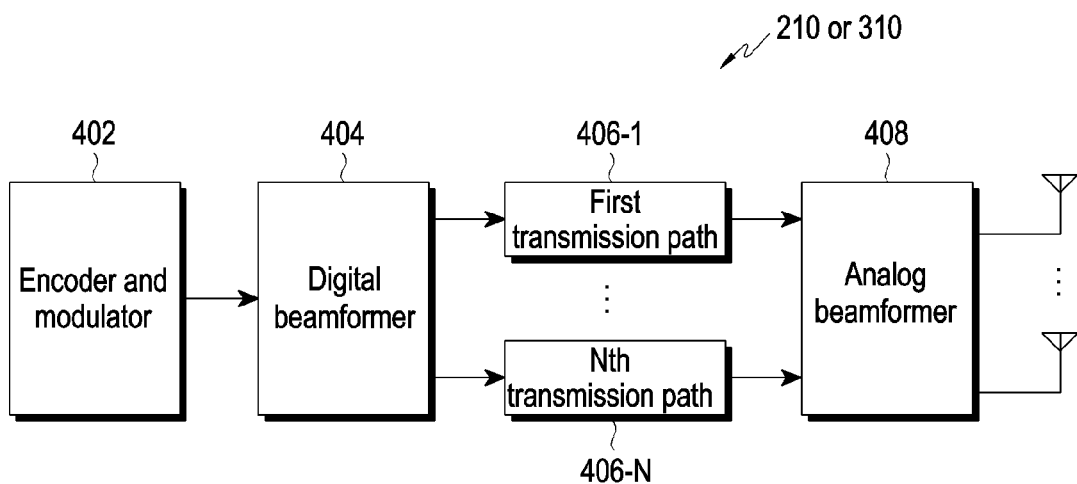
FIG. 4 is a diagram illustrating a configuration of a communication unit in the wireless communication system according to an embodiment of the disclosure.

FIG. 4 is a diagram illustrating a configuration of a communication unit in the wireless communication system according to various embodiments of the disclosure. FIG. 4 illustrates an example of a detailed configuration of the wireless communication unit 210 of FIG. 2 or the wireless communication unit 310 of FIG. 3. In an embodiment, FIG. 4 illustrates elements to perform beamforming, as a part of the wireless communication unit 210 of FIG. 2 or the wireless communication unit 310 of FIG. 3.

Referring to FIG. 4, the wireless communication unit 210 or the wireless communication unit 310 may include an encoder and modulator 402, a digital beamformer 404, multiple transmission paths 406-1 to 406-N, and an analog beamformer 408.

The encoder and modulator 402 may perform channel encoding. For channel encoding, at least one among a low-density parity check (LDPC) code, a convolution code, and a polar code may be used. The encoder and modulator 402 may generate modulation symbols by performing constellation mapping for the encoded bits.

The digital beamformer 404 may perform beamforming for digital signals (e.g., modulation symbols). To this end, the digital beamformer 404 may multiply the modulation symbols by beamforming weights. Here, the beamforming weights may be used to change the size and phase of the signals, and may be referred to as "precoding matrix", "precoder", or the like. The digital beamformer 404 may output digitally beamformed (i.e., pre-coded) modulation symbols to the multiple transmission paths 406-1 to 406-N. According to a multiple-input multiple-output (MIMO) transmission technique, the modulation symbols may be multiplexed, or the same modulation symbols may be provided to the multiple transmission paths 406-1 to 406-N.

The multiple transmission paths 406-1 to 406-N may convert digitally beamformed digital signals into analog signals. To this end, each of the multiple transmission paths 406-1 to 406-N may include an inverse fast Fourier transform (IFFT) calculator, a cyclic prefix (CP) insertion unit, a digital-to-analog converter (DAC), and an up-converter. The CP insertion unit is for an orthogonal frequency division multiplexing (OFDM) scheme, and may be excluded when another physical layer scheme (e.g., a filter bank multi-carrier (FBMC)) is applied. The multiple transmission paths 406-1 to 406-N may provide independent signal processing processes to multiple streams generated via digital beam-forming. Depending on an implementation scheme, some elements of the multiple transmission paths 406-1 to 406-N may be used in common.

The analog beamformer 408 may perform beamforming on analog signals from the multiple transmission paths 406-1 to 406-N, and connect the same to at least one antenna array including multiple antenna elements. To this end, the analog beamformer 408 may multiply analog signals by beamforming weights. Here, the beamforming weights may be used to change the size and phase of the signals. According-ing to a connection structure between the multiple transmis-sion paths 406-1 to 406-N and antennas, the analog beam-former 408 may be configured in various manners. For example, each of the multiple transmission paths 406-1 to 406-N may be connected to one antenna array. As another example, the multiple transmission paths 406-1 to 406-N may be connected to one antenna array. As another example, the multiple transmission paths 406-1 to 406-N may be adaptively connected to one antenna array or may be con-nected to two or more antenna arrays.

Frame Structure

Hereinafter, a frame structure in the 5G system will be described with reference to FIG. 5.

Figure 5:
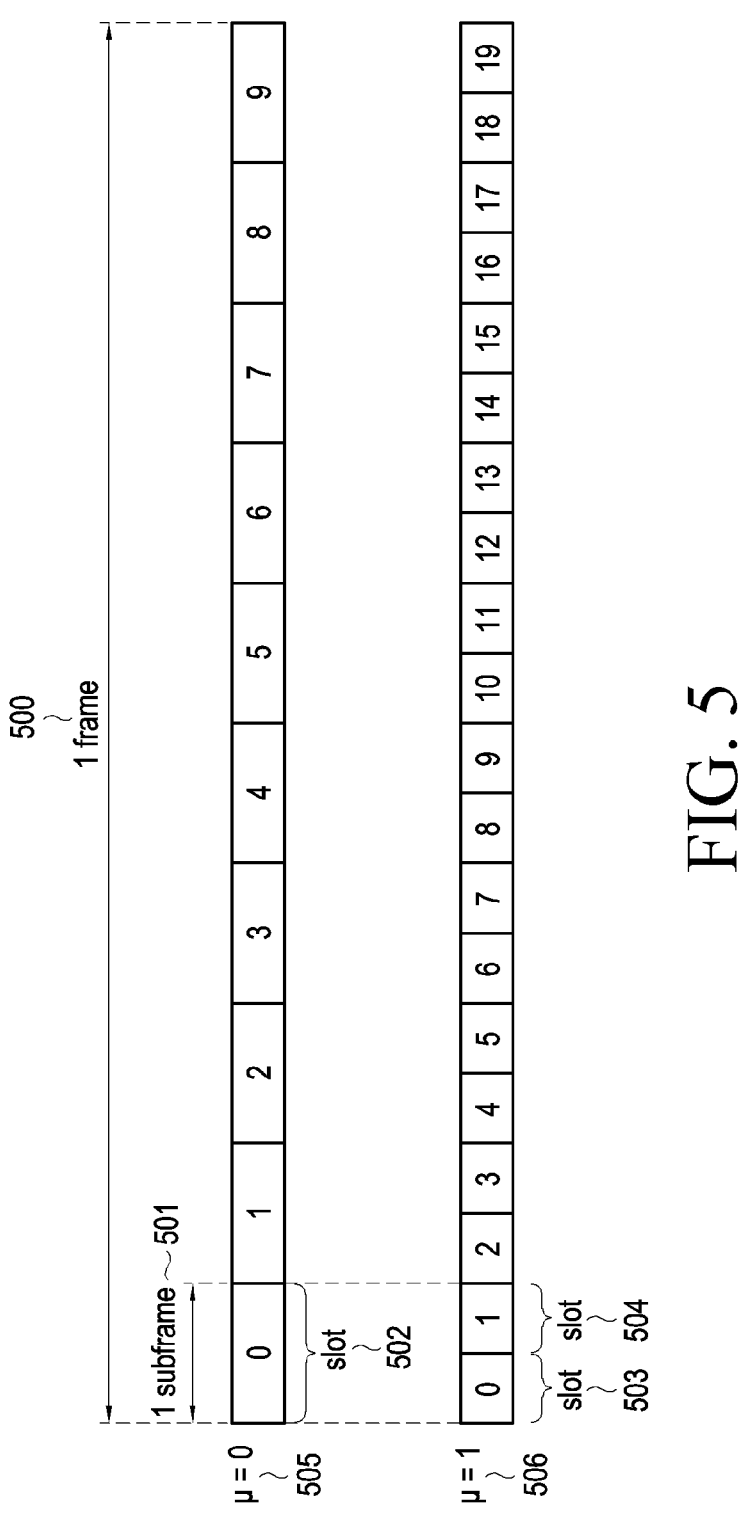
FIG. 5 is a diagram illustrating a frame, a subframe, and a slot structure in a 5G communication system.

FIG. 5 is a diagram illustrating a frame, a subframe, and a slot structure in the 5G communication system.

FIG. 5 illustrates a case of $\mu=0$ 505 indicating a subcarrier spacing of 15 kHz, a case of $\mu=1$ 506 indicating a subcarrier spacing of 30 kHz, and examples of a structure of a frame 500, a subframe 501, and slots 502, 503, and 504. In the 5G system as illustrated in FIG. 5, one frame 500 may be defined to be 10 ms. One subframe 501 may be defined to be 1 ms, and therefore one frame 500 may include a total of 10 subframes 501. One subframe 501 may include one or multiple slots. One slot may be defined to be or may include 14 OFDM symbols. That is, the number of symbols per slot $N_{symb}^{slot}$ is 14. The number $N_{symb}^{subframe,\mu}$ of slots per subframe 501 may vary according to value (numerology) $\mu$ 505 or 506 indicating a configuration for a subcarrier spacing. For example, for $\mu=0$, one subframe 501 may include one slot 502, and for $\mu=1$, one subframe 501 may include two slots 503 and 504.

The number of slots per subframe may vary according to configuration value $\mu$ for the subcarrier spacing, and accord-ingly, the number $N_{symb}^{frame,\mu}$ of slots per frame may also vary. $N_{symb}^{subframe,\mu}$ and $N_{symb}^{frame,\mu}$ according to respective subcarrier spacing configuration values $\mu$ may be defined as shown in <Table 1> below. For $\mu=2$, the UE may addition-ally receive a configuration of a cyclic prefix from the base station via higher layer signaling.

<Table 1> illustrates frame structures according to respec-tive subcarrier spacings.

TABLE 1

| $\mu$ | $\Delta f =$ $2^{\mu} \cdot 15$[kHz] | Cyclic prefix | $N_{symb}^{slot}$ | $N_{slot}^{frame,\mu}$ | $N_{slot}^{subframe,\mu}$ |
|---|---|---|---|---|---|
| 0 | 15 | Normal | 14 | 10 | 1 |
| 1 | 30 | Normal | 14 | 20 | 2 |
| 2 | 60 | Normal, Extended | 14 | 40 | 4 |

TABLE 1-continued

| $\mu$ | $\Delta f =$ $2^{\mu} \cdot 15$[kHz] | Cyclic prefix | $N_{symb}^{slot}$ | $N_{slot}^{frame,\mu}$ | $N_{slot}^{subframe,\mu}$ |
|---|---|---|---|---|---|
| 3 | 120 | Normal | 14 | 80 | 8 |
| 4 | 240 | Normal | 14 | 160 | 16 |

In the disclosure, higher layer signaling or a higher layer signal may refer to at least one of UE-specific or cell-specific radio resource control (RRC) signaling, packet data conver-gence protocol (PDCP) signaling, or a media access control (MAC) control element (CE). The higher layer signaling or the higher layer signal may include system information commonly transmitted to multiple UEs, for example, a system information block (SIB), and may also include information (for example, a physical broadcast channel (PBCH) payload) other than a master information block (MIB) in information transmitted via a PBCH. In an embodi-ment, the MIB may also be expressed to be included in the higher layer signaling or the higher layer signal.

Carrier Bandwidth

Figure 6:
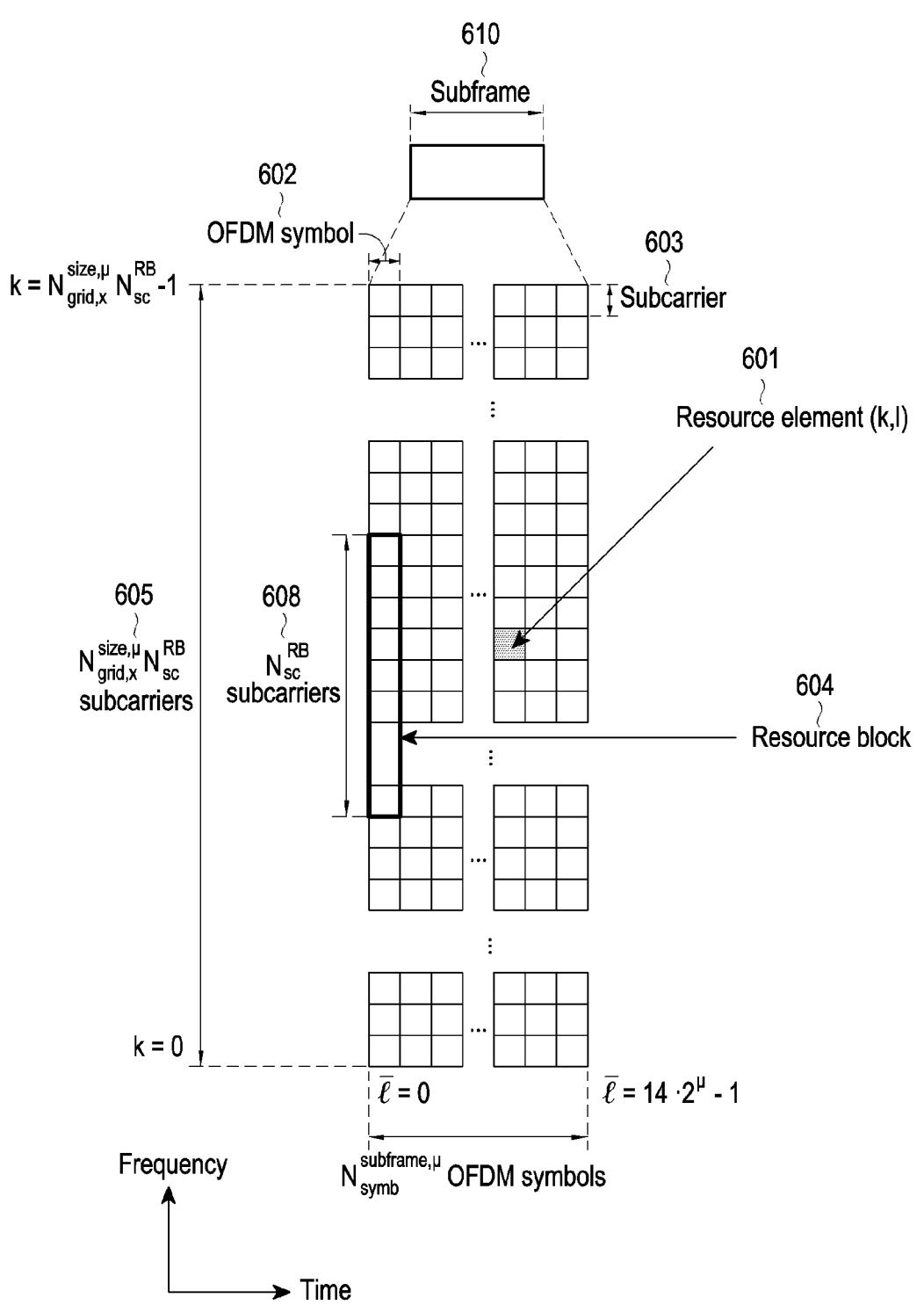
FIG. 6 is a diagram illustrating a basic structure of a time-frequency domain in the 5G communication system.

FIG. 6 is a diagram illustrating a basic structure of a time-frequency domain in the 5G communication system. That is, FIG. 6 is a diagram illustrating a basic structure of a time-frequency domain that is a radio resource area in which a data channel or a control channel is transmitted in the 5G system.

In FIG. 6, a horizontal axis represents a time domain, and a vertical axis represents a frequency domain. A basic unit of a resource in the time-frequency domain is a resource element (RE) 601 and may be defined to be one orthogonal frequency division multiplexing (OFDM) symbol 602 in the time domain and one subcarrier 603 in the frequency domain. In the frequency domain, $N_{sc}^{RB}$ (e.g., 12) consecu-tive REs may constitute one resource block (RB) 604.

With respect to each subcarrier spacing configuration value $\mu$ and a carrier, one resource grid including $N_{grid,x}^{size,\mu} N_{sc}^{RB}$ subcarriers 608 and $N_{symb}^{subframe,\mu}$ OFDM symbols may be defined to start from a common resource block (CRB) $N_{grid,x}^{start,\mu}$, indicated via higher layer signal-ing, and there may be one resource grid for a given antenna port, subcarrier spacing configuration $\mu$, and transmission direction (e.g., a downlink, an uplink, and a sidelink).

The base station may transfer carrier bandwidth $N_{grid,x}^{size,\mu}$ and start position $N_{grid,x}^{start,\mu}$ of subcarrier spac-ing configuration $\mu$ for the uplink and the downlink to the UE via higher layer signaling (e.g., higher layer parameters "carrierBandwidth" and "offsetToCarrier"). Multiple sub-carriers 605 may be configured to the UE by the higher layer signaling. In an embodiment, the carrier bandwidth $N_{grid,x}^{size,\mu}$ may be configured by higher layer parameter "carrierBandwidth" for subcarrier spacing configuration $\mu$, and the start position $N_{grid,x}^{start,\mu}$, which is a frequency offset of a subcarrier having the lowest frequency among available resources of the carriers for point A, may be configured by "offsetToCarrier" and may be represented by the number of RBs. In an embodiment, it is also possible that $N_{grid,x}^{size,\mu}$ and $N_{grid,x}^{start,\mu}$ are values in units of subcarriers. The UE having received the parameters may identify the start posi-tion and the size of the carrier bandwidth via $N_{grid,x}^{size,\mu}$ and $N_{grid,x}^{start,\mu}$. An example of information on the higher layer signaling for transmission of $N_{grid,x}^{size,\mu}$ and $N_{grid,x}^{start,\mu}$ may be as shown in <Table 2>.

<Table 2> shows higher layer signaling information element "SCS-SpecificCarrier".

TABLE 2

```
SCS-SpecificCarrier ::= SEQUENCE {
offsetToCarrier                         INTEGER (0..2199),
subcarrierSpacing                       SubcarrierSpacing,
carrierBandwidth                        INTEGER (1..maxNrofPhysicalResourceBlocks), ...,
    [[
txDirectCurrentLocation INTEGER (0..4095)        OPTIONAL    -- Need S
]]
}
```

Here, point A is a value for providing a common reference point for a resource block grid. For a PCell downlink, the UE may acquire point A via higher layer parameter "offset-ToPointA", and for all other cases, the UE may acquire point A via an absolute radio frequency channel number (ARFCN) configured by higher layer parameter "absoluteFrequency-PointA". Here, "offsetToPointA" is a frequency offset between point A and the lowest subcarrier of the lowest RB among RBs overlapping a synchronization signal/physical broadcast channel (SS/PBCH) selected or used by the UE in an initial cell selection procedure, and is represented in units of RBs.

A common resource block (CRB) number or index is increased by 1 in a direction where a value increases from 0 in the frequency domain. In an embodiment, for subcarrier spacing μ, the center of subcarrier index 0 of the common resource block and point A may coincide. Frequency domain common resource block index $n_{CRB}^{\mu}$ and an RE of subcarrier spacing μ has a $n_{CRB}^{\mu}=\lfloor k/N_{sc}^{RB}\rfloor$ relationship. Here, k is a value relatively defined with reference to point A. That is, k=0 indicates point A.

A physical resource block (PRB) of subcarrier spacing μ is defined to be an index or number from 0 to $N_{BWP,i}^{size,\mu}-1$ a bandwidth part (BWP). Here, i is a bandwidth part number or index. The relationship between the PRB ($n_{PRB}^{\mu}$) and the CRB ($n_{CRB}^{\mu}$) in bandwidth part i is $n_{CRB}^{\mu}=n_{PRB}^{\mu}+N_{BWP,i}^{start,\mu}$. Here, $N_{BWP,i}^{start,\mu}$ is the number of CRBs from CRB 0 to a first RB in which bandwidth part i starts.

BWP

Subsequently, a bandwidth part configuration in the 5G communication system will be described in detail with reference to the drawings.

Figure 7:
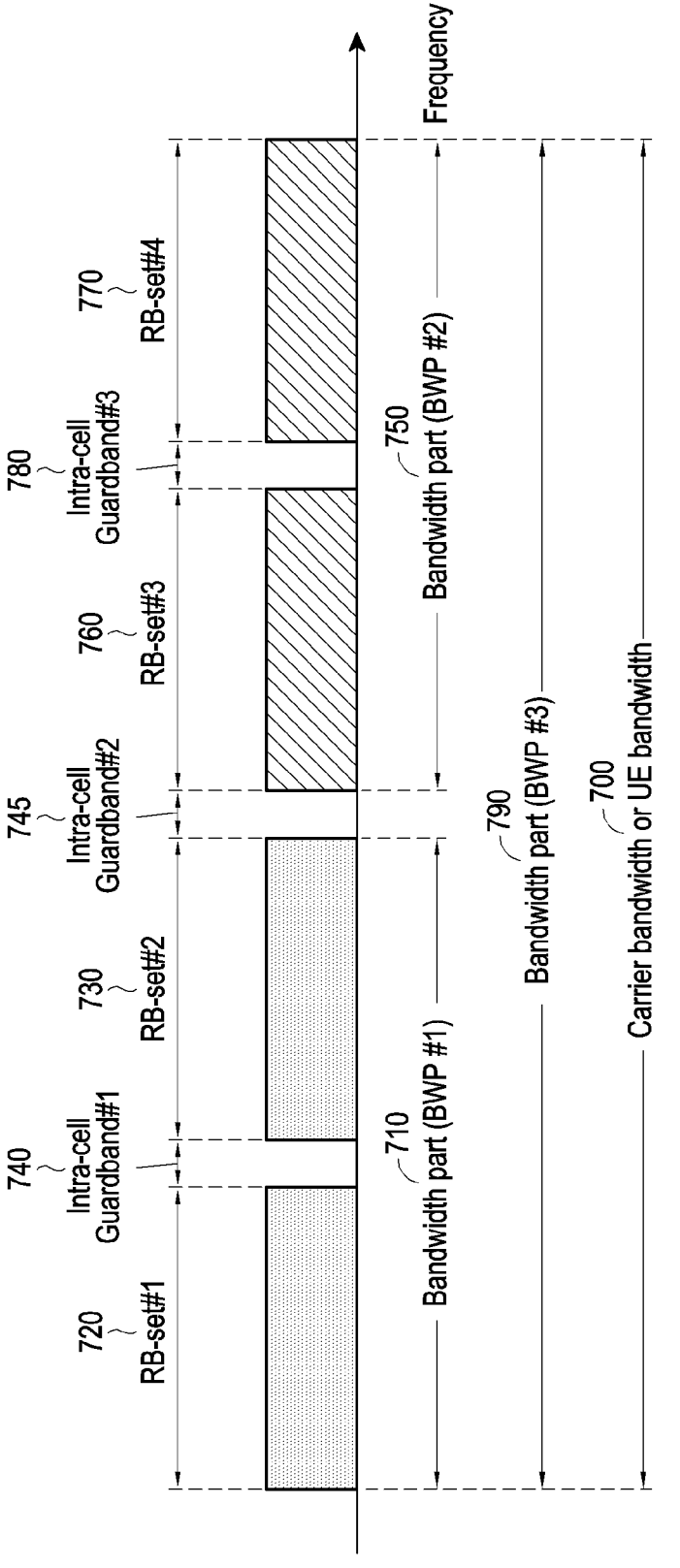
FIG. 7 is a diagram illustrating an example of a configuration of a bandwidth part and an intra-cell guard-band in the 5G communication system.

FIG. 7 is a diagram illustrating an example of a configuration of a bandwidth part and an intra-cell guard-band in the 5G communication system.

Referring to FIG. 7, in a carrier bandwidth part or a UE bandwidth 700, multiple bandwidth parts, i.e., bandwidth part #1 (BWP #1) 710, bandwidth part #2 (BWP #2) 750, and bandwidth part #3 (BWP #3) 790, may be configured. Bandwidth part #3 790 occupies the entire UE bandwidth 700. Bandwidth part #1 710 and bandwidth part #2 750 may occupy the lower half and the upper half of the UE bandwidth 700, respectively.

The base station may configure one or multiple bandwidth parts for the UE in an uplink and a downlink, and one or more of higher layer parameters described below may be configured for each bandwidth part. In an embodiment, the configuration of the bandwidth part may be independent between the uplink and the downlink.

<Table 3> below shows an example of higher layer signaling information element BWP for each bandwidth part.

TABLE 3

```
BWP ::=                          SEQUENCE {
    bwp-Id                       BWP-Id,
    locationAndBandwidth             INTEGER (1..65536),
    subcarrierSpacing                ENUMERATED {n0, n1, n2, n3,
n4, n5},
    cyclicPrefix                 ENUMERATED { extended }
}
```

Here, "bwp-Id" denotes a bandwidth part identifier, "locationAndBandwidth" denotes a bandwidth and a frequency domain position of the bandwidth part, "subcarrierSpacing" denotes a subcarrier spacing used in the bandwidth part, and "cyclicPrefix" denotes whether an extended cyclic prefix (CP) is used or a normal CP is used in the bandwidth part.

In addition to the parameters above, various parameters related to the bandwidth part may be configured to the UE. The base station may transfer the parameters to the UE via higher layer signaling, for example, RRC signaling. Within a given time, at least one bandwidth part of the configured one or more bandwidth parts may be activated. An activation indication for the configured bandwidth part may be semi-statically transferred to the UE by the base station via RRC signaling, or may be dynamically transferred via downlink control information (DCI) used for scheduling of a physical downlink shared channel (PDSCH) or a physical uplink shared (PUSCH).

According to an embodiment, the UE before an (RRC) connection may be configured with an initial bandwidth part (BWP) for initial access, by the base station via a master information block (MIB). In an embodiment, the UE may receive, via the MIB during initial access, configuration information of a search space and a control resource set (CORESET) in which a physical downlink control channel (PDCCH) may be transmitted. In an embodiment, each of the search space and the control resource set configured via the MIB may be considered to be identifier (identity (ID)) 0. The base station may notify, via the MIB, the UE of one or more pieces of information among frequency assignment information, time assignment information, and numerology for control resource set #0. Here, the numerology may include at least one of a subcarrier spacing and a CP. The CP may refer to at least one of the length of the CP or information (e.g., normal CP or extended CP) corresponding to the length of the CP.

In an embodiment, the base station may notify, via the MIB, the UE of configuration information for a monitoring periodicity and occasion for control resource set #0, that is, configuration information for search space #0. The UE may consider a frequency domain configured to be resource set #0 acquired from the MIB, as an initial bandwidth part for initial access. In an embodiment, an identity (ID) of the initial bandwidth part may be considered to be 0.

The configuration of a bandwidth part supported by the 5G may be used for various purposes.

According to an embodiment, when a bandwidth supported by the UE is smaller than a system bandwidth, data transmission or reception of the UE with respect to the system bandwidth may be supported via a bandwidth part configuration. For example, in order for the UE to transmit or receive data at a specific frequency position within the system bandwidth, the base station may configure the frequency domain position of the bandwidth part for the UE.

According to an embodiment, for the purpose of supporting different numerologies, the base station may configure multiple bandwidth parts for the UE. For example, in order to support data transmission or reception using both a subcarrier spacing of 15 kHz and a subcarrier spacing of 30 kHz for a certain UE, the base station may configure two bandwidth parts with the subcarrier spacings of 15 kHz and 30 kHz, respectively. The different bandwidth parts may be frequency division multiplexed, and when data is to be transmitted or received at a specific subcarrier spacing, a bandwidth part configured with the specific subcarrier spacing may be activated.

According to an embodiment, for the purpose of reducing power consumption of the UE, the base station may configure, for the UE, bandwidth parts having different bandwidth sizes. For example, if the UE supports a very large bandwidth, for example, a bandwidth of 100 MHz, and always transmits or receives data via the bandwidth, a very large amount of power consumption may occur. In particular, in a situation where there is no traffic, it may be very inefficient, in terms of power consumption, to perform unnecessary monitoring for a downlink control channel with a large bandwidth of 100 MHz. For the purpose of reducing power consumption of the UE, the base station may configure, for the UE, a bandwidth part of a relatively small bandwidth, for example, a bandwidth part of 20 MHz. In the situation where there is no traffic, the UE may perform monitoring in the bandwidth part of 20 MHz, and when data is generated, the UE may transmit or receive the data by using the bandwidth part of 100 MHz according to an indication of the base station.

As described above, UEs before an RRC connection may receive configuration information of the initial bandwidth part via the MIB during initial access. In an embodiment, the UE may be configured with a control resource set (CORE-SET) for a PDCCH via the MIB of a PBCH. The bandwidth of the control resource set configured via the MIB may be considered to be an initial downlink bandwidth part, and the UE may receive a PDSCH including an SIB via the initial bandwidth part. In an embodiment, the UE may detect a PDCCH from the search space and the control resource set in the initial bandwidth part configured via the MIB, may receive remaining system information (RMSI) or system information block 1 (SIB1) required for initial access, via a PDSCH scheduled by the PDCCH, and may acquire configuration information for an uplink initial bandwidth part via SIB1 (or RMSI). In addition to reception of the SIB, the initial bandwidth part may also be used for other system information (OSI), paging, or random access.

When one or more bandwidth parts are configured to the UE, the base station may indicate the UE to switch a bandwidth part, by using a bandwidth part indicator field in DCI.

For example, in FIG. 7, when the currently active bandwidth part of the UE is bandwidth part #1 710, the base station may indicate bandwidth part #2 750 to the UE via the bandwidth part indicator in the DCI, and the UE may switch the bandwidth part to indicated bandwidth part #2 750, based on the bandwidth part indicator in the received DCI.

As described above, the DCI-based switching of the bandwidth part may be indicated by the DCI for scheduling of the PDSCH or PUSCH, and thus when a request for switching the bandwidth part is received, the UE may need to receive or transmit the PDSCH or PUSCH scheduled by the DCI, with ease in the switched bandwidth part. To this end, requirements for a delay time ($T_{BWP}$) required when a bandwidth part is switched are regulated in the standards, and may be defined, for example, as shown in <Table 4>.

TABLE 4

| | NR Slot | | BWP switch delay $T_{BWP}$ (slots) | |
|---|---|---|---|---|
| μ | length (ms) | | Type 1[Note 1] | Type 2[Note 1] |
| 0 | 1 | | 1 | 3 |
| 1 | 0.5 | | 2 | 5 |
| 2 | 0.25 | | 3 | 9 |
| 3 | 0.125 | | 6 | 17 |

Note 1:
Depends on UE capability.

Note 2:
If the BWP switch involves changing of SCS, the BWP switch delay is determined by the larger one between the SCS before BWP switch and the SCS after BWP switch.

Requirements for a bandwidth part switch delay time support type 1 or type 2 according to capability of the UE. The UE may report a supportable bandwidth part delay time type to the base station.

According to the aforementioned requirements for the bandwidth part switch delay time, when the UE receives DCI including the bandwidth part switch indicator in slot n, the UE may complete switching to a new bandwidth part indicated by the bandwidth part switch indicator at a time point no later than slot ($n+T_{BWP}$), and may perform transmission or reception for a data channel scheduled by the DCI in the switched new bandwidth part. When the base station is to schedule the data channel to the new bandwidth part, time domain resource allocation for the data channel may be determined by considering the bandwidth part switch delay time ($T_{BWP}$) of the UE. That is, in determination of the time domain resource allocation for the data channel when scheduling the data channel to the new bandwidth part, the base station may schedule the data channel to be after the bandwidth part switch delay time. Accordingly, the UE may not expect that the DCI indicating bandwidth part switching indicates a slot offset (K0 or K2) having a value smaller than the bandwidth part switch delay time (TBWP).

If the UE receives DCI (e.g., DCI format 1_1 or 0_1) indicating bandwidth part switching, the UE may perform neither transmission nor reception during a time interval from a third symbol of the slot in which the PDCCH including the DCI is received to a start symbol of the slot indicated by the slot offset (K0 or K2) indicated by the time domain resource allocation field in the DCI. For example, if the UE receives the DCI indicating bandwidth part switching in slot n, and the slot offset indicated by the DCI is K, the UE may perform neither transmission nor reception from a third symbol of slot n to a symbol before slot (n+K) (i.e., the last symbol in slot (n+K−1)).

Intra-Cell Guard-Band

The UE may be configured with an intra-cell guard-band for one or more cells (or carriers). In an embodiment, the intra-cell guard-band may be configured for each of a downlink guard-band and an uplink guard-band. FIG. 7 shows an example in which the carrier bandwidth or the UE bandwidth 700 is configured with multiple intra-cell guard-bands, i.e., intra-cell guard-band #1 740, intra-cell guard-band #2 745, and intra-cell guard-band #3 780. In an embodiment, the UE may be configured with $N_{RB\text{-}set,x}$-1 uplink/downlink intra-cell guard-bands in a cell or a carrier via higher layer signaling, "IntraCellGuardBand-r16" which may be configured, for example, as shown below. Here, x is DL or UL.

<Table 5> shows an example of higher layer signaling information element IntraCellGuardBand-r16 for configuration of the intra-cell guard-band.

TABLE 5

```
IntraCellGuardBand-r16 ::= SEQUENCE (SIZE (1..ffsValue)) OF GuardBand-r16
GuardBand-r16                      ::= SEQUENCE {
    startCRB-r16                       INTEGER (0..ffs Value),
    nrofCRBs-r16                       INTEGER (1..ffs Value)
}
```

Here, "startCRB" is a start CRB index $GB_{s,x}^{start,\mu}$ in the intra-cell guard-band, and "nrofCRBs" is the length of the intra-cell guard-band and may be expressed as the number (N) of CRBs or the number (N) of PRBs. In an embodiment, "nrofCRBs" may be a value indicating a last CRB index $GB_{s,x}^{end,\mu}$ in the intra-cell guard-band. The "GuardBand" may include one or more values of startCRB and nrofCRBs, and the first value among every two values may refer to the lowest CRB index $GB_{s,x}^{start,\mu}$ in the intra-cell guard-band, and the second value may refer to the highest CRB index $GB_{s,x}^{end,\mu}$ in the intra-cell guard-band. In an embodiment, it is possible to determine $GB_{s,x}^{end,\mu}=GB_{s,x}^{start,\mu}+N$.

In an embodiment, it is also possible that the CRB index is expressed as a PRB index. The UE may also determine the number ($N_{RB\text{-}set,x}$-1) of intra-cell guard-bands configured by the base station by using the number of pairs (startCRB and nrofCRBs) included in "GuardBand" or the sequence length of "GuardBand" (e.g., sequence length/2). In an embodiment, the UE can also be configured, via "IntraCellGuardBand-r16", that there is no uplink/downlink intra-cell guard-band in a cell or a carrier, or that the guard-band is 0. For example, if "startCRB-r16" has a negative value, such as −1, or at least has numbers other than an integer, the UE may determine, via the configuration, that there is no intra-cell guard-band in a cell or a carrier.

As described above, the UE having been configured with the intra-cell guard-band may classify a resource area remaining after excluding the intra-cell guard-band in the carrier or the configured bandwidth part, as a resource set (e.g., RB-set) or a resource area including NRB-set RBs, and may perform uplink/downlink transmission or reception using a resource included in the resource set. In an embodiment, a resource area of each resource set may be determined as follows.

Start CRB index of first resource set (resource set index 0):

$$RB_{0,x}^{start,\mu}=N_{grid,x}^{start,\mu}$$

Last CRB index of last resource set (resource set index NRB-set):

$$RB_{N_{RB\text{-}set},x}^{start,\mu}=N_{grid,x}^{start,\mu}+N_{grid,x}^{size,\mu}$$

Start CRB index of resource set other than resource set described above:

$$GB_{s+1,x}^{start,\mu}=GB_{s,x}^{end,\mu}+1$$

End CRB index of resource set other than resource set described above:

$$RB_{s,x}^{end,\mu}=GB_{s,x}^{start,\mu}-1$$

Here, s=0, 1, . . . , $N_{RB\text{-}set,x}$-1, and $N_{grid,x}^{start,\mu}$ and $N_{grid,x}^{size,\mu}$ are a first available RB and an available bandwidth of the carrier according to subcarrier spacing configuration and may be configured via higher layer signaling.

FIG. 7 shows an example in which the carrier bandwidth or the UE bandwidth 700 are configured with three intra-cell guard-bands and four resource sets (NRB-set=4), i.e., resource set #1 720, resource set #2 730, resource set #3 760, and resource set #4 770.

The UE may perform uplink/downlink transmission or reception using the intra-cell guard-band and the resource included in the resource set. For example, when an uplink/downlink transmission or reception resource configured or scheduled by the base station is allocated within two consecutive resource sets, the UE may perform uplink/downlink transmission or reception using the intra-cell guard-band included between the resource sets.

If the UE has failed to be configured with the intra-cell guard-band via higher-layer signaling, "intraCellGuard-Bandx" (here, x=DL or UL), the UE may determine the intra-cell guard-band and the resource set resource area by using the intra-cell guard-band pre-defined between the UE and the base station. In an embodiment, the intra-cell guard-band may be pre-defined according the subcarrier spacing and the size of the bandwidth or the bandwidth part. The intra-cell guard-band may be independently pre-defined with respect to the downlink and the uplink, and downlink and uplink intra-cell guard-bands may be the same. Here, the intra-cell guard-band being pre-defined may indicate that, for each intra-cell guard-band, start CRB index $GB_{s,x}^{start,\mu}$ and last CRB index $GB_{s,x}^{end,\mu}$ in the intra-cell guard-band or lowest CRB index $GB_{s,x}^{start,\mu}$ and highest CRB index $GB_{s,x}^{end,\mu}$ in the intra-cell guard-band are pre-defined are predefined.

According to an embodiment, an example in which the UE is configured with at least one guard-band among uplink/downlink guard-bands in a specific cell or carrier is as follows. For a cell for performing communication via an unlicensed band, the base station may configure one or more guard-bands in a bandwidth or a bandwidth part according to a channel size of the unlicensed band and the like. For example, a 5 GHz unlicensed band includes multiple 20 MHz-sized channels, and guard-bands may exist between respective channels. Therefore, when the base station and the UE are to perform communication via a bandwidth or bandwidth part larger than 20 MHz, one or more guard-bands may be configured in the bandwidth or the bandwidth part.

For example, for the base station and the UE performing communication via a 20 MHz-sized channel in the unlicensed band, of the size of at least one bandwidth part among bandwidth parts 710, 750, and 790 configured to the UE by the base station is greater than 20 MHz, the UE may be configured with one or more intra-cell guard-bands, and may be configured to include multiple resource sets in which the size of each bandwidth part is 20 MHz, according to the configuration of the intra-cell guard-band. For example, with respect to bandwidth part #1 710 in FIG. 7, the UE may be configured with two resource sets which are resource set #1 720 and resource set #2 730, and one intra-cell guard-band that is intra-cell guard-band #1 740. The base station and the UE may perform a channel access procedure (or listen-before-talk (LBT)) for each resource set, and perform uplink/downlink transmission or reception using a resource set that has succeeded in channel access. In an embodiment, when channel access has been successful in both of two consecutive resource sets (e.g., resource set #1 720 and resource set #2 730), a resource in intra-cell guard-band #1 740 included between the resource sets may be also used for uplink/downlink transmission or reception. If channel access has failed in at least one of two consecutive resource sets (e.g., resource set #1 720 and resource set #2 730), the resource in intra-cell guard-band #1 740 included between the resource sets may not be used for uplink/downlink transmission or reception.

SS/PBCH Block

Subsequently, an SS/PBCH block in 5G will be described as follows.

The SS/PBCH block may refer to a physical layer channel block including a primary SS (PSS), a secondary SS (SSS), and a PBCH, as described below.

PSS: A PSS is a signal that serves as a reference for downlink time/frequency synchronization, and provides some information of a cell ID.

SSS: An SSS serves as a reference for downlink time/frequency synchronization, and provides the remaining cell ID information that is not provided by a PSS. Additionally, the SSS may serve as a reference signal (RS) for demodulation of a PBCH.

PBCH: A PBCH provides essential system information necessary for transmission or reception of a data channel and a control channel for a UE. The essential system information may include search space-related control information indicating radio resource mapping information of a control channel, scheduling control information on a separate data channel for transmission of system information, and the like.

SS/PBCH block: An SS/PBCH block includes a combination of a PSS, an SSS, and a PBCH. One or multiple SS/PBCH blocks may be transmitted within 5 ms, and each transmitted SS/PBCH block may be distinguished by an index.

The UE may detect a PSS and an SSS during initial access and may decode a PBCH. An MIB may be acquired from the PBCH, and control resource set #0 (which may correspond to a control resource set having a control resource set index of 0) may be configured therefrom. The UE may perform monitoring on control resource set #0, assuming that a selected SS/PBCH block (or an SS/PBCH block that has successfully performed PBCH decoding) and a demodulation reference signal (DMRS) transmitted in control resource set #0 are quasi co-located (QCL). The UE may acquire system information via downlink control information transmitted in control resource set #0. The UE may acquire random-access channel (RACH)-related configuration information necessary for initial access, from the acquired system information. The UE may transmit a physical RACH (PRACH) to the base station in consideration of a selected SS/PBCH block index, and the base station having received the PRACH may acquire the SS/PBCH block index selected by the UE. The base station may identify that the UE has selected a certain block from among respective SS/PBCH blocks and monitors control resource set #0 associated therewith.

DCI

Subsequently, downlink control information (DCI) in the 5G system will be described as follows.

In the 5G system, scheduling information for uplink data (or PUSCH) or downlink data (or PDSCH) is transferred from the base station to the UE via DCI. The UE may attempt to monitor or detect at least one of a DCI format for fallback and a DCI format for non-fallback with respect to a PUSCH or a PDSCH. The fallback DCI format may include fields pre-defined between the base station and the, and the non-fallback DCI may include configurable fields.

The DCI may be transmitted on a physical downlink control channel (PDCCH) via channel coding and modulation. A cyclic redundancy check (CRC) may be attached to a DCI payload, and the CRC may be scrambled by a radio network temporary identifier (RNTI) corresponding to the identity of the UE. Different RNTIs may be used depending on the purpose of the DCI, for example, UE-specific data transmission, a power control command, a random-access response, or the like. That is, the RNTI is not transmitted explicitly, but is included in CRC calculation so as to be transmitted. When the DCI transmitted on the PDCCH is received, the UE may perform CRC check using an assigned RNTI and may identify, if a result of the CRC check shows success, that the DCI has been transmitted to the UE.

For example, DCI for scheduling of a PDSCH for system information (SI) may be scrambled by an SI-RNTI. DCI for scheduling of a PDSCH for a random-access response (RAR) message may be scrambled by an RA-RNTI. DCI for scheduling of a PDSCH for a paging message may be scrambled by a P-RNTI. DCI for notification of a slot format indicator (SFI) may be scrambled by an SFI-RNTI. DCI for notification of a transmit power control (TPC) may be scrambled by a TPC-RNTI. DCI for scheduling of a UE-specific PDSCH or PUSCH may be scrambled by a cell RNTI (C-RNTI).

DCI format 0_0 may be used for fallback DCI for scheduling of a PUSCH, wherein CRC thereof may be scrambled by at least one of C-RNTI, configured scheduling (CS)-RNTI, or modulation coding scheme (MCS)-C-RNTI. DCI format 0_0 having a CRC scrambled by at least one of the C-RNTI, CS-RNTI, and MCS-C-RNTI may include, for example, at least one piece of information below.

Control information format identifier (identifier for DCI formats): Identifier for identification of a DCI format. For example, for the UE having received DCI via a 1-bit identifier, if a value of the identifier is 0, the DCI has a UL DCI format (e.g., DCI format 0_1), and of the value is 1, the DCI has a DL DCI format (e.g., DCI format 1-0).

Frequency domain resource assignment: Including $\lceil \log_2 (N_{RB}^{UL,BWP}(N_{RB,UL,BWP}+1)/2) \rceil$ bits indicating RBs which are frequency domain resources assigned in resource allocation type 1. Here, when the UE monitors DCI format 0_0 in a common search space, $N_{RB}^{UL,BWP}$ may be the size of an initial uplink bandwidth part. When the UE monitors DCI format 0_0 in a UE-specific search space, $N_{RB}^{UL,BWP}$ may be the size of a currently activated uplink bandwidth part. In other words, a bandwidth part for determination of the size of a frequency domain resource assignment field may vary according to a search space in which a fallback DCI format is transmitted.

In an embodiment, when PUSCH hopping is performed, $N_{UL\_hop}$ most significant bits (MSBs) among $\lceil \log_2 (N_{RB}^{UL,BWP}(N_{RB}^{UL,BWP}+1)/2) \rceil$ bits may be used to indicate a frequency offset. Here, $N_{UL\_hop}=1$ indicates that two offsets are configured via higher layer signaling, $N_{UL\_hop}=1$ indicates that four offsets are configured via higher layer signaling, and $\lceil \log_2 (N_{RB}^{UL,BWP}(N_{RB}^{UL,BWP}+1)/2) \rceil - N_{UL\_hop}$ bits indicate a frequency domain resource area assigned according to resource allocation type 1 described below.

According to an embodiment, when no PUSCH hopping is performed, $\lceil \log_2 (N_{RB}^{UL,BWP}(N_{RB}^{UL,BWP}+1)/2) \rceil$ bits provide a frequency domain resource area assigned according to resource allocation type 1.

Time domain resource assignment: Indicating, with 4 bits, a row index of a time domain resource allocation table including a PUSCH mapping type, a PUSCH transmission slot offset, a PUSCH start symbol, and the number of PUSCH transmission symbols. The time domain resource allocation table may be configured via higher layer signaling or may be pre-configured (pre-config) between the base station and the UE.

Frequency hopping flag: Indicating, with 1 bit, whether to perform (enable) PUSCH hopping or not to perform (disable) PUSCH hopping.

Modulation and coding scheme (MCS): Indicating a modulation and coding scheme used for data transmission.

New data indicator (NDI): Indicating whether transmission is HARQ initial transmission or retransmission.

Redundancy version (RV): Indicating a redundancy version of HARQ.

HARQ process number: Indicating a process number of HARQ.

TPC command: Indicating a transmission power control command for a scheduled PUSCH.

Padding bit: A field for adjusting the size (the number of total bits) of a DCI format to be the same as that of another DCI format (e.g., DCI format 1_0), wherein 0 is inserted when necessary.

UL/SUL indicator: 1-bit indicator, wherein, if a cell has two or more ULs and the size of DCI format 1_0 before adding a padding bit is greater than the size of DCI format 0_0 before adding a padding bit, a UL/SUL indicator is 1 bit, and otherwise, no UL/SUL indicator exists or a UL/SUL indicator is 0 bit. If a UL/SUL indicator exists, the UL/SUL indicator is located in the last bit of DCI format 0_0 subsequent to a padding bit.

ChannelAccess-CPext: Indicating, with 2 bits, a channel access type and CP extension in a cell operating in an unlicensed band. For a cell operating in a licensed band, ChannelAccess-CPext does not exist or is 0 bit.

For DCI formats other than DCI format 0_0, the 3GPP standard documents is referred to.

Time Domain Resource Allocation

Hereinafter, time domain resource allocation for a data channel in the 5G communication system will be described.

The base station may configure, for the UE, a table of time domain resource allocation for a downlink data channel (PDSCH) and an uplink data channel (PUSCH) via higher layer signaling (e.g., RRC signaling), or a table for time domain resource allocation pre-defined between the base station and the UE may be used as shown in <Table 6>.

For example, for fallback DCI, the UE may use a table pre-defined as shown in Table 6. For non-fallback DCI, the UE may use a table configured via higher layer signaling.

TABLE 6

| Row index | PUSCH mapping type | $K_2$ | S | L |
|---|---|---|---|---|
| 1 | Type A | j | 0 | 14 |
| 2 | Type A | i | 0 | 12 |
| 3 | Type A | 1 | 0 | 10 |
| 4 | Type B | 1 | 2 | 10 |
| 5 | Type B | 1 | 4 | 10 |
| 6 | Type B | 1 | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | i + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

In an embodiment, in order to perform time domain resource allocation configured via higher layer signaling, a table including up to 16 (maxNrofDL-Allocations=16) entries may be configured for the PDSCH, and a table including up to 16 (maxNrofUL-Allocations=16) entries may be configured for the PUSCH. Each table described above may include, for example, a PDCCH-to-PDSCH slot timing (corresponding to a time interval in units of slots between a time point at which a PDCCH is received and a time point at which a PDSCH scheduled by the received PDCCH is transmitted, and denoted as $K_0$), a PDCCH-to-PUSCH slot timing (corresponding to a time interval in units of slots between a time point at which a PDCCH is received and a time point at which a PUSCH scheduled by the received PDCCH is transmitted, and denoted as $K_2$), the position (S) and length (L) of a start symbol, in which the PDSCH or PUSCH is scheduled, within a slot, a mapping type of the PDSCH or PUSCH, and the like.

When higher layer signaling is used, the base station may notify the UE of, for example, an information element, such as a PDS CH-TimeDomainResourceAllocationList information element and a PUSCH-TimeDomainResourceAllocation information element, in <Table 7> and <Table 8> below.

TABLE 7

```
PDSCH-TimeDomainResourceAllocation ::= SEQUENCE {
k0                          INTEGER(0..32) OPTIONAL, -- Need S
mapping Type                ENUMERATED {typeA, typeB},
startSymbolAndLength        INTEGER (0..127)
}
```

TABLE 8

```
PUSCH-TimeDomainResourceAllocation ::= SEQUENCE {
k2                          INTEGER(0..32) OPTIONAL, -- Need S
mappingType                 ENUMERATED {typeA, typeB},
startSymbolAndLength        INTEGER (0..127)
}
```

Here, "k0" indicates a PDCCH-to-PDSCH timing as an offset in units of slots, "k2" indicates a PDCCH-to-PUSCH timing as an offset in units of slots, "mappingType" indicates a mapping type of a PDSCH or PUSCH, and "startSymbolAndLength" indicates a start symbol and the length of the PDSCH or PUSCH.

The base station may notify the UE of one of entries of the time domain resource allocation table via L1 signaling. For example, a "time domain resource allocation" field in the DCI may be used for indication. The UE may acquire time domain resource allocation for the PDSCH or PUSCH, based on a field in the DCI received from the base station.

Frequency Domain Resource Allocation

Hereinafter, a frequency domain resource allocation for a data channel in the 5G communication system will be described.

There are two types of frequency domain resource allocation methods, i.e., resource allocation type 0 and resource allocation type 1, for a downlink data channel (PDSCH) and an uplink data channel (PUSCH).

Resource allocation type 0 is a method of allocating a resource in units of resource block groups (RBGs) including P consecutive RBs, and may be notified in a bitmap form to the UE by the base station. In an embodiment, the RBG may include a set of consecutive virtual RBs (VRBs), and size P of the RBG (nominal RBG size P) may be determined based on a value configured with higher layer parameter "rbg-Size" and a size value of a bandwidth part which may be defined in <Table 9> described below.

TABLE 9

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Here, the number NRBG of all RBGs of bandwidth part $i$ having a size of $N_{BWP,i}^{size}$ is $N_{RBG}=\lceil (N_{BWP,i}^{size}+(N_{BWP,i}^{start}\bmod P))/P\rceil$. Here, the size of a first RBG is $RBG_0^{size}=P-N_{BWP,i}^{start}\bmod P$. If the size $RBG_{last}^{size}$ of a last RBG is $(N_{BWP,i}^{start}+N_{BWP,i}^{size})\bmod P>0$, then $RBG_{last}^{size}=(N_{BWP,i}^{start}+N_{BWP,i}^{size})\bmod P$, and otherwise, $RBG_{last}^{size}=P$. The size of all other RBGs is P. Each bit of a bitmap having a size of $N_{RBG}$ bits may correspond to each RBG. RBGs may be indexed in an ascending order of frequency starting from a lowest frequency position of a bandwidth part. With respect to NRBG RBGs in a bandwidth part, RBG #0 to RBG #($N_{RBG}-1$) may be mapped from an MSB to an LSB of an RBG bitmap. If a specific bit value in a bitmap is 1, the UE may determine that an RBG corresponding to the bit value has been assigned, and if a specific bit value in a bitmap is 0, the UE may determine that an RBG corresponding to the bit value has not been assigned.

Resource allocation type 1 is a method of allocating a resource according to a start position and the length of consecutively allocated VRBs, wherein interleaving or non-interleaving may be additionally applied to the consecutively allocated VRBs. A resource allocation field of resource allocation type 1 may be configured by a resource indication value (RIV), and the RIV may be configured by a start point ($RB_{start}$) of a VRB and the length ($L_{RB_s}$) of consecutively allocated RBs. $RB_{start}$ may indicate an index of a first PRB in which resource allocation starts, and $L_{RB_s}$ may indicate the length or number of consecutively allocated PRBs. In an embodiment, an RIV in a bandwidth part having a size of $N_{BWP}^{size}$ may be defined as follows.

$$\text{If } (L_{RBs}-1) \le \left\lfloor \frac{N_{BWP}^{size}}{2} \right\rfloor \text{ then } RIV = N_{BWP}^{size}(L_{RBs}-1) + RB_{start}$$

-continued $$\text{Else, } RIV = N_{BWP}^{size}(N_{BWP}^{size} - L_{RBs} - 1) + (N_{BWP}^{size} - 1 - RB_{start})$$

where, $L_{RBs} \ge 1$ and shall not exeed $N_{BWP}^{size} - RB_{start}$.

In an embodiment, $N_{BWP}^{size}$ may vary depending on a search space in which a fallback DCI format (e.g., DCI format 0_0 or DCI format 1_0) is transmitted. For example, when DCI format 0_0 which is a fallback DCI format in DCI (i.e., uplink grant (UL grant)) for configuring or scheduling of uplink transmission is transmitted in a common search space (CSS), an initial uplink bandwidth part (initial bandwidth part) size, $N_{BWP,0}^{size}$, or $N_{BWP}^{initial}$ may be used for $N_{BWP}^{size}$. Similarly, when DCI format 1_0 which is a fallback DCI format in DCI for configuring or scheduling of downlink reception is transmitted in a common search space (CSS), $N_{BWP}^{size}$ or $N_{BWP}^{initial}$ is the size of control resource set #0 when control resource set #0 is configured for a cell, and is the size of an initial downlink bandwidth part when control resource set #0 is not configured for the cell.

In an embodiment, when DCI format 0_0 or DCI format 1_0 which is a fallback DCI format is transmitted in a UE-specific search space (USS), or when the size of the fallback DCI format transmitted in the UE-specific search space is determined based on the size of the initial uplink bandwidth part or initial downlink bandwidth part and the DCI is applied to another active bandwidth part having the size of $N_{BWP}^{active}$, an RIV may correspond to $RB_{start}=0,K,$ $2K, \ldots, (N_{BWP}^{initial}-1)/K$ and $L_{RB_s}=K,2K, \ldots,$ $N_{BWP}^{initial}K$, and may be defined as follows.

$$\text{If } (L'_{RB_s}-1) \le \lfloor N_{BWP}^{initial}/2 \rfloor \text{ then } RIV = N_{BWP}^{initial}(L'_{RB_s}-1)+RB'_{start}$$

$$\text{Else, } RIV = N_{BWP}^{initial}(N_{BWP}^{initial}-L'_{RBs}-1)+(N_{BWP}^{initial}-1-RB'_{start})$$

where, $L'_{RBs}=L_{RBs}/K$, $RB'_{start}=RB_{start}/K$, $L'_{RBs}$ shall not exceed $N_{BWP}-RB'_{start}$ In an embodiment, if $N_{BWP}^{active}>N_{BWP}^{initial}$, then K is the largest value satisfying $K \le \lfloor N_{BWP}^{active}/N_{BWP}^{initial} \rfloor$ in a set of {1, 2, 4, 8}. Otherwise, $(N_{BWP}^{active} \le N_{BWP}^{initial})$, K is 1.

The base station may configure, for the UE, a resource allocation type via higher layer signaling. For example, higher layer parameter "resourceAllocation" may be configured to be one of "resourceAllocationType0", "resourceAllocationType1", and "dynamicSwitch". If both resource allocation types and 1 are configured to the UE or higher layer parameter resourceAllocation is configured to be dynamicSwitch, a most significant bit (MSB) in a resource allocation field in a DCI format indicating scheduling may indicate resource allocation type 0 or resource allocation type 1, resource allocation information may be indicated via bits remaining after excluding the MSB from the resource allocation field according to the indicated resource allocation type, and the UE may interpret, based on the indication, resource allocation information of the DCI. If one of resource allocation type 0 and resource allocation type 1 is configured to the UE or higher layer parameter "resourceAllocation" is configured to be one of "resourceAllocationType0" and "resourceAllocationType1", a resource allocation field in a DCI format indicating scheduling may indicate resource allocation information according to the configured resource allocation type, and the UE may interpret, based on the indication, resource allocation field information of the DCI.

CORESET

Hereinafter, a downlink control channel in the 5G communication system will be described with reference to the drawings.

Figure 8:
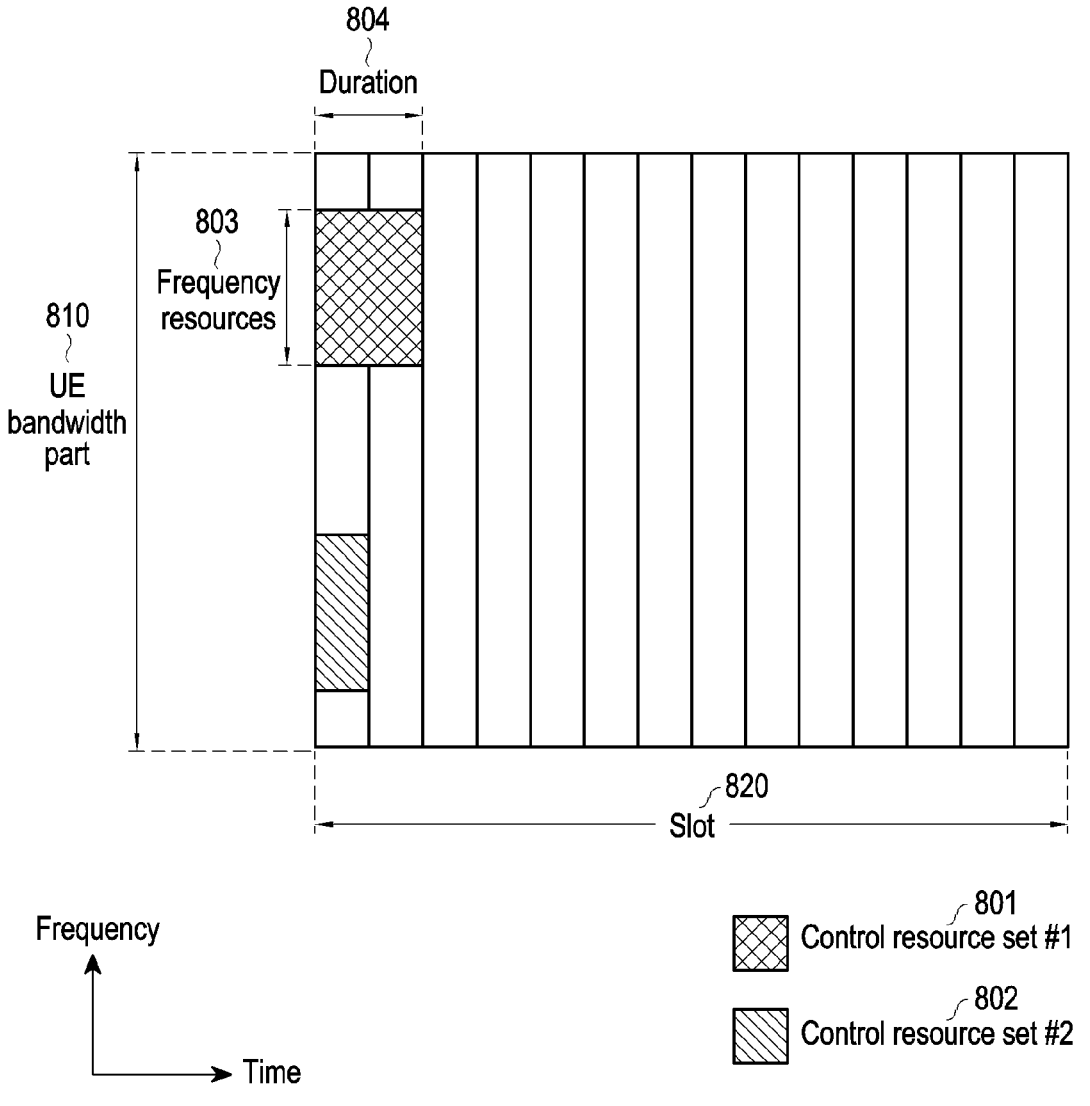
FIG. 8 is a diagram illustrating an example of a configuration of a control resource set of a downlink control channel in the 5G communication system.

FIG. 8 is a diagram illustrating an example of a configuration of a control resource set of a downlink control channel in the 5G communication system. In other words, FIG. 8 is a diagram illustrating an example of a control resource set (CORESET) in which a downlink control channel is transmitted in the 5G wireless communication system.

Referring to FIG. 8, a UE bandwidth part 810 is configured in the frequency domain, and two control resource sets, i.e., control resource set #1 801 and control resource set #2 802, are configured in one slot 820 in the time domain. The control resource sets 801 and 802 may be configured in a specific frequency resource 803 in the UE bandwidth part 810 in the frequency domain, and one or multiple OFDM symbols may be configured in the time domain. The OFDM symbols may be defined to be a control resource set (CORESET) duration 804. Referring to the illustrated example, control resource set #1 801 is configured to be a 2-symbol control resource set duration, and control resource set #2 802 is configured to be a 1-symbol control resource set duration.

Each control resource set described above may be configured to the UE by the base station via higher layer signaling, for example, at least one of system information, an MIB, or RRC signaling. Configuration of a control resource set for a UE refers to providing information, such as an identity of the control resource set, a frequency position of the control resource set, and a symbol length of the control resource set. For example, a higher layer signaling information element or control resource set configuration information for configuring of a control resource set may include information of a ControlResourceSet information element in <Table 10> below.

Figure 9:
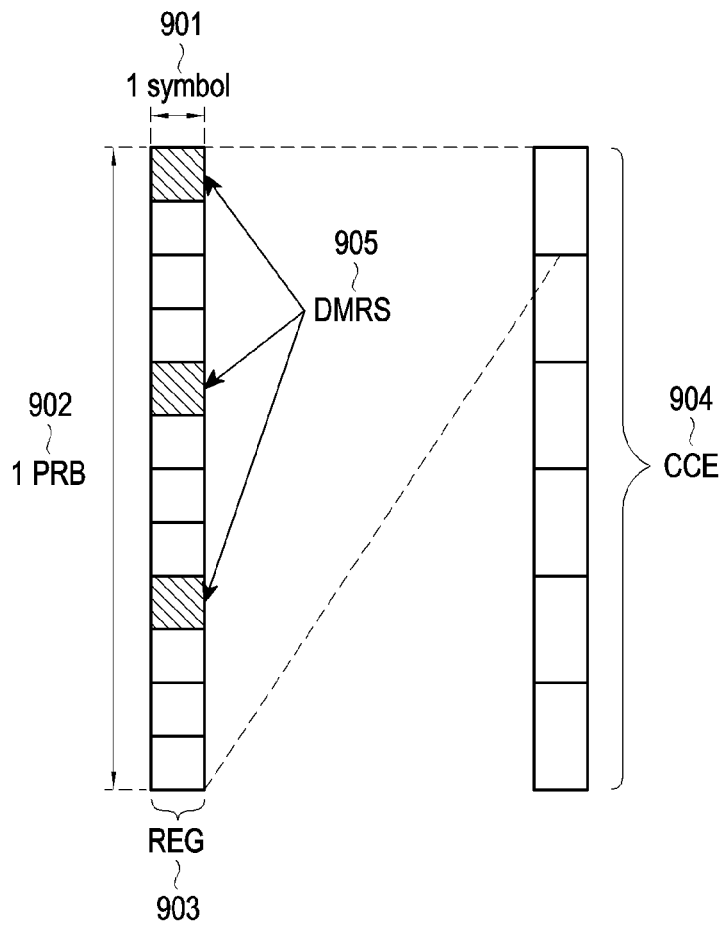
FIG. 9 is a diagram illustrating a structure of a downlink control channel of a 5G communication system.

FIG. 9 is a diagram illustrating a structure of a downlink control channel of the 5G communication system. That is, FIG. 9 is a diagram showing an example of a basic unit of time and frequency resources constituting a downlink control channel which may be used in the 5G wireless communication system.

Referring to FIG. 9, a basic unit of time and frequency resources constituting a control channel is referred to as a resource element group (REG) 903, and the REG 903 may be defined to have 1 OFDM symbol 901 in the time domain and 1 PRB 902, that is, 12 subcarriers, in the frequency domain. A base station may configure a unit of assigning a downlink control channel by concatenation with at least one REG 903.

In 5G, when a basic unit for assigning a downlink control channel is a control channel element (CCE) 904, 1 CCE 904 may include multiple REGs 903. In description with an example of the illustrated the REG 903, the REG 903 may include 12 REs, and if 1 CCE 904 includes 6 REGs 903, 1 CCE 904 may include 72 REs. An area in which a downlink control resource set is configured may include multiple CCEs 904, and a specific downlink control channel may be mapped to one or multiple CCEs 904 according to an aggregation level (AL) within the control resource set. The CCEs 904 within the control resource set are classified by numbers, wherein the numbers of the CCEs 904 may be assigned according to a logical mapping scheme.

The basic unit of a downlink control channel, i.e., the REG 903, may include both an area of REs, to which DCI is mapped, and an area to which a DMRS 905 used for DCI demodulation is mapped. At least one (3 in the illustrated

TABLE 10

```
ControlResourceSet ::= SEQUENCE {
controlResourceSetId              ControlResourceSetId,
frequencyDomainResources              BIT STRING (SIZE (45)),
duration                              INTEGER (1..maxCoReSetDuration),
cce-REG-MappingType CHOICE {
interleaved SEQUENCE {
reg-BundleSize ENUMERATED {n2, n3, n6},
interleaverSize ENUMERATED {n2, n3, n6},
shiftIndex INTEGER(0..maxNrofPhysicalResourceBlocks-1) OPTIONAL -- Need S
},
nonInterleaved NULL
},
precoderGranularity ENUMERATED {sameAsREG-bundle, allContiguousRBs},
tci-StatesPDCCH-ToAddList SEQUENCE(SIZE (1..maxNrofTCI-StatesPDCCH))
OF TCI-StateId OPTIONAL, -- Cond NotSIB1-initialBWP
tci-StatesPDCCH-ToReleaseList SEQUENCE(SIZE
(1..maxNrofTCI-StatesPDCCH)) OF TCI-StateId OPTIONAL, -- Cond
NotSIB1-initialBWP
tci-PresentInDCI ENUMERATED {enabled} OPTIONAL, -- Need S
pdcch-DMRS-ScramblingID INTEGER (0..65535) OPTIONAL, -- Need S
}
```

Here, "controlResourceSetId" indicates a control resource set (CORESET) identity, "frequencyDomainResources" indicates a frequency domain resource, "duration" indicates a time duration of a control resource set, i.e., a time domain resource, "cce-REG-MappingType" indicates a CCE-to-REG mapping scheme, "reg-BundleSize" indicates an REG bundle size, "interleaverSize" indicates an interleaver size, and "shiftIndex" indicates an interleaver shift.

tci-StatesPDCCH is configuration information of transmission configuration indication (TCI) states, and may include a CSI-RS index or one or multiple SS/PBCH block indices in a quasi-co-located (QCL) relationship with DMRSs transmitted in the corresponding control resource set.

example) DMRS 905 may be transmitted in 1 REG 903. The number of CCEs required to transmit a downlink control channel may be 1, 2, 4, 8, or 16 depending on an aggregation level (AL), and different numbers of CCEs may be used to implement link adaptation of the downlink control channel. For example, if AL=L, a single downlink control channel may be transmitted via L CCEs. A UE needs to detect a signal within a control resource set without knowing the presence of a downlink control channel, wherein a search space indicating a set of CCEs may be defined for such blind decoding. The search space is a set of downlink control channel candidates including CCEs, for which the UE needs to attempt decoding on a given aggregation level, and since there are various aggregation levels that make one bundle with 1, 2, 4, 8, or 16 CCEs, the UE may have multiple search spaces. A search space set may be defined to be a set of search spaces at all configured aggregation levels.

Search Space

A search space for a PDCCH may be classified into a common search space (CSS) and a UE-specific search space (USS). A certain group of UEs or all UEs may monitor a common search space to receive cell-common control information, such as dynamic scheduling of system information or a paging message. For example, PDSCH scheduling assignment information for transmission of an SIB including cell operator information, etc. may be detected by monitoring a common search space. The common search space may be defined to be a set of CCEs assigned in advance so that a certain group of UEs or all UEs are able to receive a PDCCH. Scheduling assignment information for a UE-specific PDSCH or PUSCH may be detected by monitoring a UE-specific search space. The UE-specific search space may be defined UE-specifically, based on an identity of the UE and functions of various system parameters.

In the 5G wireless communication system, a parameter for the search space of the PDCCH may be configured by the base station for the UE via higher layer signaling (e.g., SIB, MIB, and RRC signaling). For example, the base station may configure, for the UE, the number of PDCCH candidates at each aggregation level L, a monitoring periodicity for a search space, a monitoring occasion in units of symbols in a slot for the search space, a search space type (common search space or UE-specific search space), a combination of an RNTI and a DCI format, which is to be monitored in the search space, a control resource set index for monitoring of the search space, and the like.

For example, higher layer signaling information elements for configuring parameters for a search space for PDCCH may be as shown in <Table 11> below.

TABLE 11

```
SearchSpace ::=                             SEQUENCE {
    searchSpaceId                               SearchSpaceId,
    controlResourceSetId                        ControlResourceSetId OPTIONAL, -- Cond
SetupOnly
    monitoringSlotPeriodicityAndOffset            CHOICE {
sl1 NULL,
sl2 INTEGER (0..1),
...
    }                                       OPTIONAL,
-- Cond Setup
    duration                        INTEGER (2..2559) OPTIONAL, -- Need R
    monitoringSymbolsWithinSlot           BIT STRING (SIZE (14)) OPTIONAL, --
Cond Setup
    nrofCandidates                          SEQUENCE {
        aggregationLevel1               ENUMERATED {n0, n1, n2, n3, n4, n5,
n6, n8},
        aggregationLevel2               ENUMERATED {n0, n1, n2, n3, n4, n5,
n6, n8},
        aggregationLevel4               ENUMERATED {n0, n1, n2, n3, n4, n5,
n6, n8},
        aggregationLevel8               ENUMERATED {n0, n1, n2, n3, n4, n5,
n6, n8},
        aggregationLevel16              ENUMERATED {n0, n1, n2, n3, n4, n5,
n6, n8}
    }                                       OPTIONAL,
-- Cond Setup
    searchSpaceType                         CHOICE {
        common                                  SEQUENCE {
            dci-Format0-0-AndFormat1-0        SEQUENCE {
...
        },
        ue-Specific                         SEQUENCE {
dci-Formats ENUMERATED {formats0-0-And-1-0, formats0-1-And-1-1},
...
        }
    }    OPTIONAL    -- Cond Setup2
}
```

Here, "searchSpaceId" indicates a search space identifier, "controlResourceSetId" indicates a control resource set identifier, "monitoringSlotPeriodicityAndOffset" indicates monitoring slot level periodicity, "duration" indicates the length of a time duration to be monitored, "monitoringSymbolsWithinSlot" indicates symbols for PDCCH monitoring within a slot, "nrofCandidates" indicates the number of PDCCH candidates at each aggregation level, "searchSpaceType" indicates a search space type, "common" includes parameters for a common search space, and "ue-Specific" includes parameters for a UE-specific search space.

According to the configuration information, the base station may configure one or multiple search space sets for the UE. According to an embodiment, the base station may configure search space set 1 and search space set 2 for the UE, may configure DCI format A, which is scrambled by an X-RNTI in search space set 1, to be monitored in a common search space, and may configure DCI format B, which is scrambled by a Y-RNTI in search space set 2, to be monitored in a UE-specific search space.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

In an embodiment, specified RNTIs may comply with the following definitions and uses.

Cell RNTI (C-RNTI): For UE-specific PDSCH scheduling

Temporary cell RNTI (TC-RNTI): For UE-specific PDSCH scheduling

Configured scheduling RNTI (CS-RNTI): For semi-statically configured UE-specific PDSCH scheduling Random-access RNTI (RA-RNTI): For PDSCH scheduling during random access Paging RNTI (P-RNTI): For scheduling PDSCH on which paging is transmitted System information RNTI (SI-RNTI): For scheduling PDSCH on which system information is transmitted Interruption RNTI (INT-RNTI): For indicating whether to puncture PDSCH Transmit power control for PUSCH RNTI (TPC-PUSCH-RNTI): For indicating a power control command for PUSCH Transmit power control for PUCCH RNTI (TPC-PUCCH-RNTI): For indicating a power control command for PUCCH Transmit power control for SRS RNTI (TPC-SRS-RNTI): For indicating a power control command for a sounding reference signal (SRS)

The aforementioned DCI formats may comply with the following definitions.

TABLE 12

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G communication system, such as NR, a physical channel and a physical signal may be distinguished as follows. For example, an uplink/downlink physical channel refers to a set of REs transferring information transmitted via a higher layer, and may include, representatively, a PDCCH, a PUCCH, a PDSCH, a PUSCH, and the like. An uplink/downlink physical signal refers to a signal used in a physical layer without transferring information transmitted via a higher layer, and may include, representatively, a DM-RS, a CSI-RS, an SRS, and the like.

In the disclosure, a physical channel and a physical signal may be expressed as "signal" without being distinguished as described above. For example, describing that a base station transmits a downlink signal may indicate that the base station transmits at least one of a downlink physical channel and a downlink physical signal including a PDCCH, a PDSCH, a DM-RS, a CSI-RS, and the like. In other words, the term "signal" in the disclosure may be used as a term including both the channel and the signal described above, and if necessary, the meaning thereof may be distinguished according to the context.

Slot Format Indicator (SFI)

In the 5G communication system, a downlink signal transmission duration and an uplink signal transmission duration may dynamically change. To this end, the base station may indicate, to the UE via a slot format indicator (SFI), whether each of OFDM symbols constituting one slot is a downlink symbol, an uplink symbol, or a flexible symbol. Here, the flexible symbol may be neither a downlink symbol nor an uplink symbol, or may refer to a symbol that may be changed to a downlink or an uplink symbol by UE-specific control information or scheduling information. In an embodiment, the flexible symbol may include a gap guard required in switching from a downlink to an uplink.

The UE having received the slot format indicator may perform downlink signal reception from the base station in a symbol indicated as a downlink symbol, and perform uplink signal transmission to the base station in a symbol indicated as an uplink symbol. The UE may at least perform PDCCH monitoring in a symbol indicated as a flexible symbol, and the UE may perform, in the flexible symbol via another indicator, e.g., DCI, downlink signal reception from the base station (e.g., when DCI format 1_0 or 1_1 is received) and uplink signal transmission to the base station (e.g., when DCI format 0_0 or 0_1 is received).

Figure 10:
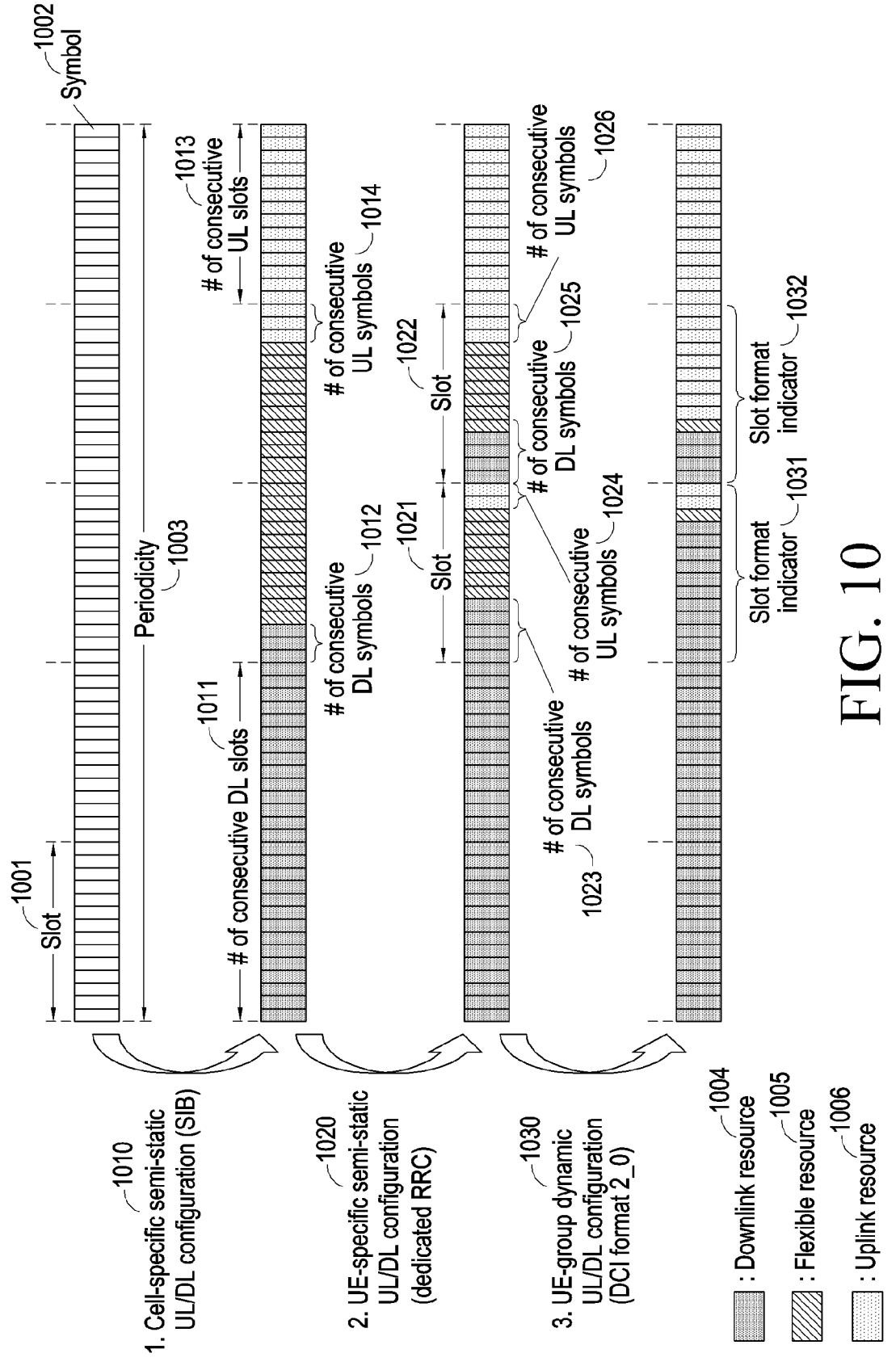
FIG. 10 is a diagram illustrating an example of an uplink-downlink configuration in the 5G communication system.

FIG. 10 is a diagram illustrating an example of an uplink-downlink configuration (UL/DL configuration) in the 5G system, and illustrates three stages of the uplink-downlink configuration of a symbol/slot.

Referring to FIG. 10, in a first state, cell-specific configuration information 1010 for semi-static uplink-downlink configuration, for example, system information such as an SIB, is used for uplink-downlink configuration of a symbol/slot. In an embodiment, the cell-specific uplink-downlink configuration information 1010 in the system information may include information indicating uplink-downlink pattern information and reference subcarrier spacing. The uplink-downlink pattern information may indicate a transmission periodicity 1003 of each pattern, the number of consecutive downlink slots from a start point of each pattern (number of consecutive full DL slots at the beginning of each DL-UL pattern) 1011, the number of consecutive downlink symbols from a start point of a subsequent slot (number of consecutive DL symbols in the beginning of the slot following the last full DL slot) 1012, the number of consecutive uplink slots from the end of each pattern (number of consecutive full UL slots at the end of each DL-UL pattern) 1013, and the number of symbols of an immediately preceding slot (number of consecutive UL symbols in the end of the slot preceding the first full UL slot) 1014. In an embodiment, the UE may determine, as a flexible slot/symbol, a slot/symbol which is indicated for neither an uplink nor a downlink.

In a second stage, UE-specific configuration information 1020 transferred via higher layer signaling (i.e., RRC signaling) dedicated to the UE may indicate symbols to be configured for a downlink or an uplink in slots 1021 and 1022 including a flexible symbol or a flexible slot. For example, the UE-specific uplink-downlink configuration information 1020 may include a slot index indicating the slots 1021 and 1022 including a flexible symbol, the number of consecutive downlink symbols 1023 and 1025 from the beginning of each slot (number of consecutive DL symbols in the beginning of the slot), the number of consecutive uplink symbols 1024 and 1026 from the end of each slot (number of consecutive UL symbols in the end of the slot), information indicating the entire downlink of each slot, or information indicating the entire uplink of each slot. In an embodiment, a symbol/slot configured for an uplink or a downlink via the cell-specific configuration information 1010 in the first stage cannot be changed to that for a downlink or an uplink via UE-specific higher layer signaling 1020.

Finally, in order to dynamically change a downlink signal transmission duration and an uplink signal transmission duration, downlink control information (e.g., DCI format 2_0) of a downlink control channel may include a slot format indicator 1030 indicating whether each symbol in each slot (e.g., a slot 1031 or a slot 1032) among multiple slots starting from a slot in which the UE has detected the downlink control information corresponds to a downlink symbol, an uplink symbol, or a flexible symbol. In an embodiment, the slot format indicator 1030 may not indicate the symbol/slot, which has been configured for an uplink or a downlink in the first and second stages, to be for a downlink or an uplink. In an embodiment, a slot format of each slot 1031 or 1032 including at least one symbol that is not configured for an uplink or a downlink in the first and second stages may be indicated by the slot format indicator 1030 in the corresponding downlink control information (e.g., DCI format 2_0).

The slot format indicator 1030 may indicate uplink-downlink configurations for 14 symbols in one slot, as shown in <Table 13> below. The slot format indicator 1030 may perform UE-group dynamic UL/DL configuration for concurrent transmission to multiple UEs via a UE group (or cell)-common control channel. In an embodiment, downlink control information including the slot format indicator 1030 may be transmitted via a PDCCH CRC-scrambled by an identifier other than a UE-specific cell-RNTI (C-RNTI), for example, an SFI-RNTI. The downlink control information may include the slot format indicator 1030 for one or more slots, i.e., N slots. Here, an N value may be an integer larger than 0, or a value configured to the UE by the base station via higher layer signaling from among pre-defined available values, such as 1, 2, 5, 10, and 20. The size of the slot format indicator 1030 may be configured to the UE by the base station via higher layer signaling.

<Table 13> describes details of a slot format indicator (SFI).

TABLE 13

| For-mat | Symbol number in a slot (or index) | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| | | | | | | | . . . | | | | | | | |
| 9 | F | F | F | F | F | F | F | F | F | F | F | F | U | U |
| | | | | | | | . . . | | | | | | | |
| 19 | D | F | F | F | F | F | F | F | F | F | F | F | F | U |
| | | | | | | | . . . | | | | | | | |
| 54 | F | F | F | F | F | F | F | D | D | D | D | D | D | D |
| 55 | D | D | F | F | F | U | U | U | D | D | D | D | D | D |
| 56-254 | | | | | | | Reserved | | | | | | | |
| 255 | | | | UE determines the slot format for the slot based on tdd-UL-DL-ConfigurationCommon, or tdd-UL-DL-ConfigurationDedicated and, if any, on detected DCI formats | | | | | | | | | | |

Here, D denotes a downlink symbol, U denotes an uplink symbol, and X denotes a flexible symbol. According to <Table 13>, the total number of supportable slot formats for one slot is 256. In the NR system, the maximum size of an information bit available for slot format indication is 128 bits, and may be configured to the UE by the base station via higher layer signaling, for example, "dci-PayloadSize".

In an embodiment, for a cell operating in an unlicensed band, an additional slot format may be configured and indicated by introducing one or more additional slot formats or modifying one or more existing slot formats, as shown in <Table 14>. <Table 14> shows an example of additional slot formats in which one slot includes only an uplink symbol and a flexible symbol (F).

TABLE 14

| For-mat | Symbol number in a slot (or index) | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| . . . | | | | | | | | | | | | | | |

In an embodiment, downlink control information used for slot format indication may indicate slot format(s) for multiple service cells, and the slot format(s) for the respective serving cells may be distinguished via serving cell IDs. A slot format combination for one or more slots for each serving cell may be indicated by the downlink control information. For example, if the size of one slot format indicator index field in the downlink control information is 3 bits and indicates a slot format for one serving cell, the 3-bit slot format indicator index field may indicate one of a total of 8 slot formats (or a slot format combination), and the base station may indicate the slot format indicator index field via UE-group common downlink control information (common DCI).

In an embodiment, at least one slot format indicator index field included in the downlink control information may include a slot format combination indicator for multiple slots. For example, <Table 15> shows 3-bit slot format combination indicators. Among values of the slot format combination indicators, one of {0, 1, 2, 3, 4} indicates a slot format for one slot. The remaining 3 values {5, 6, 7} indicate slot formats for 4 slots, and the UE may sequentially apply the indicated slot formats to 4 slots starting from a slot in which downlink control information including the slot format combination indicator has been detected.

TABLE 15

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |

TABLE 15-continued

| Slot format combination ID | Slot Formats |
|---|---|
| 6 | 1 1 1 1 |
| 7 | 2 2 2 2 |

Cell Group Configuration

According to an embodiment of the disclosure, the base station may configure one or multiple cell groups for the UE. In an embodiment, the base station may configure parameters in <Table 16> below for the UE during cell group configuration.

<Table 16> shows an example of parameters which may be included in information element CellGroupConfig that is higher layer signaling for configuring one or multiple cell groups for the UE.

TABLE 16

```
-- ASNISTART
-- TAG-CELLGROUPCONFIG-START
-- Configuration of one Cell-Group:
CellGroupConfig ::=                                    SEQUENCE {
    cellGroupId                                        CellGroupId,
    rlc-BearerToAddModList                             SEQUENCE (SIZE(1..maxLC-ID)) OF
RLC-BearerConfig                                       OPTIONAL,   -- Need N
    rlc-BearerToReleaseList                            SEQUENCE (SIZE(1..maxLC-ID)) OF
LogicalChannelIdentity                                 OPTIONAL,   -- Need N
    mac-CellGroupConfig                                MAC-CellGroupConfig
OPTIONAL,   -- Need M
    physicalCellGroupConfig                            PhysicalCellGroupConfig
OPTIONAL,   -- Need M
    spCellConfig                                       SpCellConfig
OPTIONAL,   -- Need M
    sCellToAddModList                                  SEQUENCE (SIZE
(1..maxNrofSCells)) OF SCellConfig                     OPTIONAL,   -- Need N
    sCellToReleaseList                                 SEQUENCE (SIZE
(1..maxNrofSCells)) OF SCellIndex                      OPTIONAL,   -- Need N
    ...,
    [[
    reportUplinkTxDirectCurrent                        ENUMERATED {true}
OPTIONAL    -- Cond BWP-Reconfig
    ]],
    [[
    bap-Address-r16                                    BIT STRING (SIZE
(10)) OPTIONAL,   -- Need M
    bh-RLC-ChannelToAddModList-r16                     SEQUENCE
(SIZE(1..maxBH-RLC-ChannelID-r16)) OF BH-RLC-ChannelConfig-r16
OPTIONAL,   -- Need N
    bh-RLC-ChannelToReleaseList-r16                    SEQUENCE
(SIZE(1..maxBH-RLC-ChannelID-r16)) OF BH-RLC-ChannelID-r16
OPTIONAL,   -- Need N
    f1c-TransferPath-r16                               ENUMERATED {lte,
nr, both}
OPTIONAL,   -- Need M
    simultaneousTCI-UpdateList1-r16                    SEQUENCE (SIZE
(1..maxNrofServingCellsTCI-r16)) OF ServCellIndex           OPTIONAL,
    -- Need R
    simultaneousTCI-UpdateList2-r16                    SEQUENCE (SIZE
(1..maxNrofServingCellsTCI-r16)) OF ServCellIndex           OPTIONAL,
    -- Need R
    simultaneousSpatial-UpdatedList1-r16               SEQUENCE (SIZE
(1..maxNrofServingCellsTCI-r16)) OF ServCellIndex           OPTIONAL,
    -- Need R
    simultaneousSpatial-UpdatedList2-r16               SEQUENCE (SIZE
(1..maxNrofServingCellsTCI-r16)) OF ServCellIndex           OPTIONAL,
    -- Need R
    uplinkTxSwitchingOption-r16                        ENUMERATED
{switchedUL, dualUL}
OPTIONAL,   -- Need R
    uplinkTxSwitchingPowerBoosting-r16                 ENUMERATED
{enabled}
OPTIONAL    -- Need R
    ]]
}
```

TABLE 16-continued

```
-- Serving cell specific MAC and PHY parameters for a SpCell:
SpCellConfig ::=                                        SEQUENCE {
  servCellIndex                                           ServCellIndex
OPTIONAL,   -- Cond SCG
  reconfigurationWithSync                                 ReconfigurationWithSync
OPTIONAL,   -- Cond ReconfWithSync
  rlf-TimersAndConstants                                  SetupRelease
{ RLF-TimersAndConstants }                                   OPTIONAL,   --
Need M
  rlmInSyncOutOfSyncThreshold                             ENUMERATED {n1}
OPTIONAL,   -- Need S
  spCellConfigDedicated                                   ServingCellConfig
OPTIONAL,   -- Need M
  ...
}
ReconfigurationWithSync ::=                             SEQUENCE {
  spCellConfigCommon                                       ServingCellConfigCommon
OPTIONAL,   -- Need M
  newUE-Identity                                          RNTI-Value,
  t304                                                    ENUMERATED {ms50,
ms100, ms150, ms200, ms500, ms1000, ms2000, ms10000},
  rach-ConfigDedicated                                    CHOICE {
    uplink
RACH-ConfigDedicated,
    supplementaryUplink                                       RACH-ConfigDedicated
  }
OPTIONAL,   -- Need N
  ...,
]]
  smtc                                                   SSB-MTC
OPTIONAL   -- Need S
  ]],
  [[
  daps-UplinkPowerConfig-r16                             DAPS-UplinkPowerConfig-r16
OPTIONAL   -- Need N
  ]]
}
DAPS-UplinkPowerConfig-r16 ::=                          SEQUNCE {
  p-DAPS-Source-r16                                        P-Max,
  p-DAPS-Target-r16                                        P-Max,
  uplinkPowerSharingDAPS-Mode-r16                          ENUMERATED
{semi-static-model, semi-static-mode2, dynamic }
}
SCellConfig ::=                                         SEQUENCE {
  sCellIndex                                               SCellIndex,
  sCellConfigCommon                                        ServingCellConfigCommon
OPTIONAL,   -- Cond SCellAdd
  sCellConfigDedicated                                   ServingCellConfig
OPTIONAL,   -- Cond SCellAddMod
  ...,
  [[
  smtc                                                   SSB-MTC
OPTIONAL   -- Need S
  ]],
  [[
  sCellState-r16                                         ENUMERATED {activated}
OPTIONAL,   -- Cond SCellAddSync
  secondaryDRX-GroupConfig-r16                           ENUMERATED {true}
OPTIONAL   -- Cond DRX-Config2
  ]]}
-- TAG-CELLGROUPCONFIG-STOP
-- ASNISTOP
```

Here, p-DAPS-Source and p-DAPS-Target include P-Max which is a parameter for designating a maximum total transmission power used by the UE in a source/target cell group during dual active protocol stack (DAPS) handover. uplinkPowerSharingDAPS-Mode-r16 may be used to configure an uplink power sharing mode of the UE to be one of semi-static-model, semi-static-mode2, and dynamic.

Figure 11:
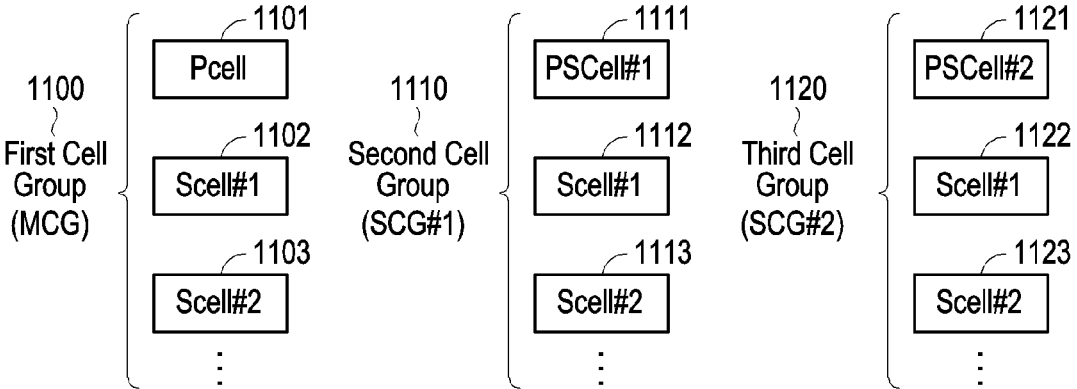
FIG. 11 is a diagram illustrating an example of multi-connectivity cell group configuration according to an embodiment of the disclosure.

FIG. 11 is a diagram illustrating an example of multi-connectivity cell group configuration according to an embodiment of the disclosure.

Referring to FIG. 11, cell group configuration information (CellGroupConfig) may include at least one of multiple parameters indicated in <Table 16>, and may be used to configure one master cell group (MCG) 1100 and one or multiple secondary cell groups (SCGs) 1110 and 1120. One cell group may include one primary cell (PCell) 1101, 1111, or 1121 and one or multiple secondary cells (SCells) 1102, 1103, 1112, 1113, 1122, and 1123. In an embodiment, it is also possible that all cells constituting one cell group are secondary cells. For example, it is also possible that a first secondary cell group includes one primary cell and one or multiple secondary cells, and only one or multiple secondary cells constitute a secondary cell group starting from a second secondary cell group.

The primary cell 1101 in the MCG 1100 may be referred to as a PCell, and primary cells in the SCGs 1110 and 1120 may be referred to primary secondary cells (PSCells) 1111 and 1121. Each primary cell in each cell group may be collectively referred to as a special cell (SpCell). The base station may transmit configuration information on a secondary cell in each cell group to the UE via an SpCell in each cell group, and the UE may receive, via an SpCell, configuration information on a secondary cell in a cell group to which the SpCell belongs. For example, the UE may receive configuration information on the SCells 1102, 1103, 1112, 1113, 1122, and 1123 in each cell group via the SpCells 1101, 1111, and 1121.

Figure 12:
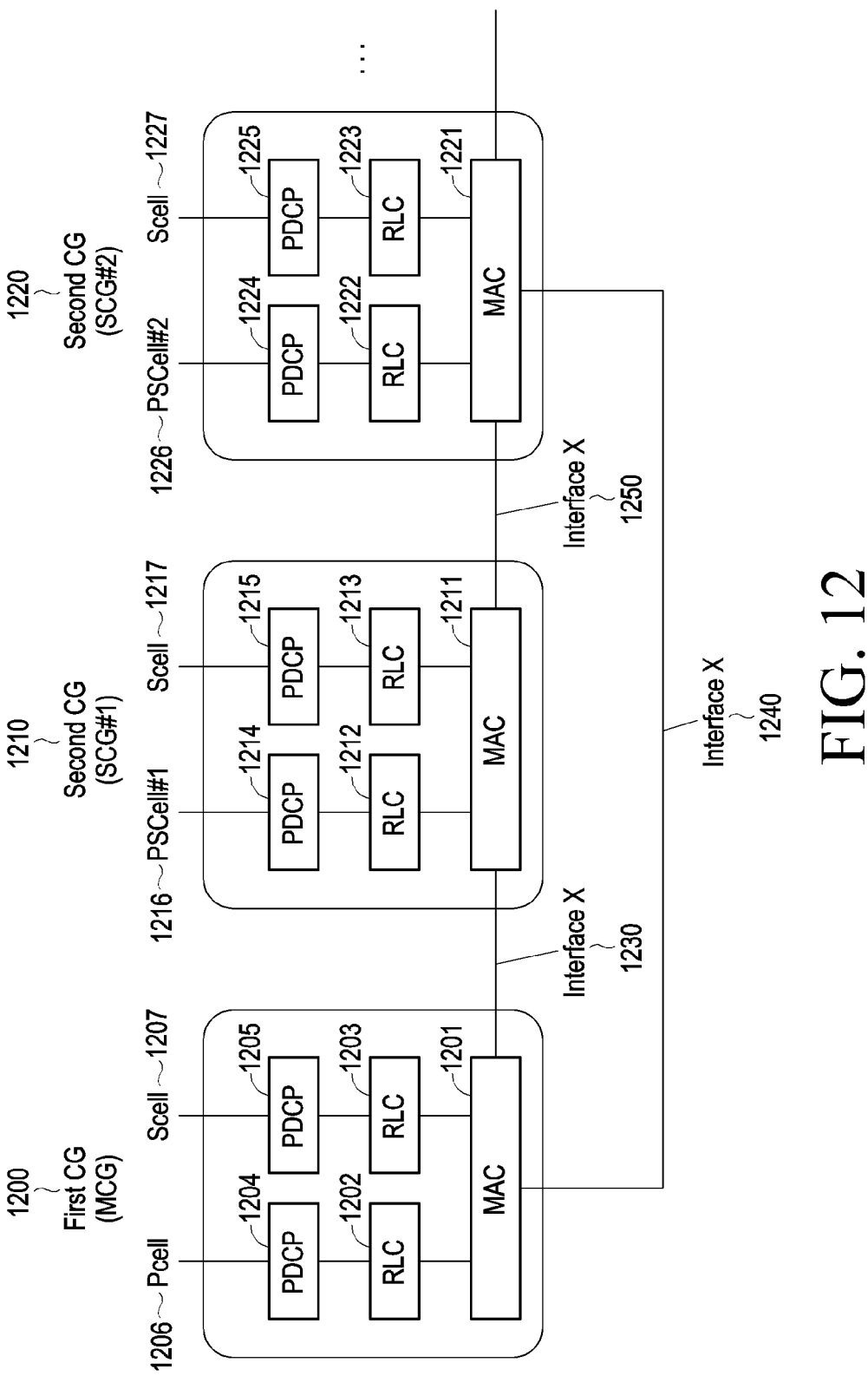
FIG. 12 is a diagram illustrating an example of protocol stacks of cell groups according to an embodiment of the disclosure.

FIG. 12 is a diagram illustrating an example of protocol stacks of cell groups according to an embodiment of the disclosure.

Referring to FIG. 12, a protocol stack for one cell group may include a set of multiple logical channels connected to one MAC entity and multiple radio link control (RLC) entities. In an embodiment, one cell group 1200, 1210, or 1220 may include a PCell 1206 for one primary cell (MCG) 1200 or a PSCell 1216 or 1226 for the SCG 1210 or 1220, and one or multiple secondary cells 1207, 1217, or 1227. At least one MAC entity 1201, 1211, or 1221 may exist for one cell group 1200, 1210, or 1220, and the MAC entity 1201, 1211, or 1221 may be responsible for scheduling for cells (i.e., the primary cell and one or more secondary cells in the cell group) in the cell group. One logical channel may exist for each cell in one cell group 1200, 1210, or 1220. Accordingly, one cell group may include multiple RLC entities 1202, 1203, 1212, 1213, 1222, or 1223 and packet data convergence protocol (PDCP) entities 1204, 1205, 1214, 1215, or 1224, 1225.

The RLC entity may perform operations, such as segmentation and concatenation of packets for traffic generated in each cell, data transmission error and retransmission management, and order identification and reordering of received data.

The PDCP entity may perform IP header compression and decompression for traffic generated in each cell, user data transmission, and maintaining of the sequence number for the radio bearer.

An interface (e.g., referred to as "interface X" in the disclosure) 1230 or 1240 for exchanging information between the MAC entities in respective cell groups may be defined. FIG. 12 shows an example in which the MAC entity 1201 of the MCG 1200 and the MAC entity 1211 of SCG #1 1210 are connected via the interface X 1230, the MAC entity 1201 of the MCG 1200 and the MAC entity 1221 of SCG #2 1220 are connected via the interface X 1240, and the MAC entity 1211 of SCG #1 1210 and the MAC entity 1221 of SCG #2 1220 are connected via an interface X 1250.

The MAC entities of all or some of the cell groups may be connected via the interface X to exchange information. For example, the MAC entities of all the cell groups may be connected via the interface X, or the MAC entities of specific cell groups may be connected via the interface X. As another example, the MAC entities of all or some of the secondary cell groups may be connected to the MAC entity of the master cell group via the interface X.

The MAC entities of two cell groups may be connected via the interface X, and information necessary for scheduling between the two cell groups may be exchanged via the interface X. For example, in FIG. 12, the MAC 1201 of the MCG 1200 and the MAC 1211 entity of SCG #1 1210 may be connected via the interface X 1230, and all or some of the MAC 1201 scheduling information of the MCG 1200 and the MAC 1211 scheduling information of SCG #1 1210 may be exchanged via the interface X 1230. The base station may control scheduling operations in the respective cell groups, based on the scheduling information exchanged between the MCG 1200 and SCG #1 1210.

The base station may notify the UE of whether the interface X exists between cell groups via higher layer signaling. Based on whether the interface X exists between specific cell groups, the base station may control scheduling of the cell groups. The UE may be notified of the existence of the interface X between the specific cell groups from the base station via higher layer signaling, and control transmission or reception in the corresponding cell groups, based on the notification.

When the specific cell groups exchange information between the MAC entities via the interface X, all or some of information related to scheduling may be exchanged. If all the information of the MAC entities on the specific cell groups is exchanged via the interface X, this may be similar to when the specific cell groups operate using one MAC entity. If some of the information on the MAC entities of the cell groups is exchanged via the interface X, limited scheduling operation may be performed between the cell groups.

The base station may notify, via higher layer signaling, the UE of configuration information (e.g., parameters exchanged via the interface X) related to the information exchanged between the cell groups via the interface X. The base station may control scheduling of the specific cell groups, based on the information exchanged via the interface X. The UE may receive, from the base station via higher layer signaling, the configuration information (e.g., parameters exchanged via the interface X) related to the information exchanged between the specific cell groups via the interface X. The UE may control transmission or reception in the specific cell groups, based on the received configuration information related to the information exchanged via the interface X.

When the specific cell groups exchange information between the MAC entities via the interface X, a specific delay time ($T_{delay}$) may occur. Accordingly, when the base station controls scheduling for each cell group, based on the information exchanged via the interface X, a delay time ($T_{delay}$) may be taken into account.

The base station may notify, via higher layer signaling, the UE of configuration information (e.g., whether a delay time occurs and/or the amount of delay) related to a delay time ($T_{delay}$) occurring when information is exchanged between the specific cell groups via the interface X. The base station may control scheduling of cell groups by considering the delay time ($T_{delay}$). The UE may receive, from the base station via higher layer signaling, the configuration information (e.g., whether a delay time occurs and/or the amount of delay) related to a delay time ($T_{delay}$) occurring when information is exchanged between the specific cell groups via the interface X. The UE may control transmission or reception in the cell groups, based on the notified information related to the delay time ($T_{delay}$).

BWP State Shift

In a next-generation mobile communication system such as an NR system, multiple bandwidth parts may be configured for each downlink or each uplink in one cell (SPcell, PCell, PScell, or SCell), and an active bandwidth part (active DL or UL BWP), a dormant bandwidth part (dormant BWP or dormant DL BWP), or a deactivated bandwidth part (inactive or deactivated DL/UL BWP) may be configured and operated via bandwidth part switching. That is, with respect to the one cell, a data transmission rate may be increased by a method similar to carrier aggregation by shifting a downlink or uplink bandwidth part to an active state, the downlink bandwidth part may be shifted or switched to a dormant bandwidth part to prevent the UE from performing PDCCH monitoring on the cell, thereby reducing battery consumption, and the UE may perform channel measurement for the dormant or inactive downlink bandwidth part and report a channel measurement result, so as to support fast activation of the cell or bandwidth part. Battery consumption of the UE may be reduced by shifting the downlink (or uplink) bandwidth part to be inactive in the one cell. In the above, a state shift indication or a bandwidth part switching indication for each bandwidth part in each cell may be configured or indicated via an RRC message, an MAC CE, or downlink control information (DCI) of a PDCCH.

The dormant bandwidth part may be extended and applied to dual connectivity, and may be applied to, for example, a PSCell of a secondary cell group. As another method, by extending the dormant bandwidth part to the concept of cell group suspension or cell group deactivation, cell group suspension or deactivation may be indicated to one cell group (e.g., secondary cell group) of a UE for which dual connectivity is configured, so that data transmission or reception may be suspended, PDCCH monitoring may be suspended, or PDCCH monitoring may be intermittently performed based on a very long cycle in the indicated cell group, thereby reducing power consumption of the UE.

The indication of cell group suspension or cell group deactivation for each cell group may be configured and indicated by via an RRC message, an MAC CE, or downlink control information (DCI) of the PDCCH. The UE indicated to suspend or deactivate the cell group may perform channel measurement in the cell group indicated for suspension and deactivation, and may report a channel measurement result to a network (e.g., to a master cell group, a primary cell group, or a secondary cell group), thereby supporting fast activation of dual connectivity.

In the above, with respect to the cell group for which cell group suspension or deactivation has been indicated, the UE may perform the channel measurement or may maintain and store the cell group configuration information without discarding or clearing the same, or may restore the cell group configuration information according to a cell group activation or resumption indication by the network.

For example, the cell group configuration information (e.g., configuration information or bearer configuration information of each PDCP, RLC, or MAC layer device (MAC layer entity)) or configuration information of each cell, which is configured to the UE, may be stored or maintained without a change. If cell group resumption or activation is indicated to the cell group for which cell group suspension or deactivation has been indicated, the UE may resume, restore, or re-apply the cell group configuration information, and may resume a bearer, re-start data transmission or reception, re-start PDCCH monitoring, perform channel measurement reporting, or may reactivate configured transmission resources periodically.

In the disclosure, a cell group being suspended or inactive may indicate that all cells belonging to the cell group are inactive and/or all bandwidth parts of all cells belonging to the cell group are inactive or dormant. In an embodiment, a cell group being suspended or inactive may indicate that all cells other than at least one cell among cells belonging to the cell group are inactive and/or all bandwidth parts of the inactive cells are inactive or dormant. In the at least one cell, at least one bandwidth part may be active or dormant.

In the disclosure, a cell being in an active mode or an activated state may indicate that, in an activated bandwidth part, an activated normal bandwidth part, or a bandwidth part other than an activated dormant bandwidth part of the cell in the active mode or activated state, the UE may exchange uplink or downlink data with the base station, perform PDCCH monitoring to identify an indication of the base station, perform channel measurement for a downlink of the cell in the active mode or activated state (or the activated bandwidth part, activated normal bandwidth part, or bandwidth part other than the activated dormant bandwidth part of the cell), report measurement information periodically to the base station, and transmit a pilot signal (sounding reference signal (SRS)) periodically to the base station so that the base station is able to perform uplink channel measurement.

In the disclosure, a cell being in an active mode or an activated state may indicate that, in an activated dormant bandwidth part of the cell in the active mode or activated state, the UE cannot exchange uplink or downlink data with the base station, or does not perform PDDCH monitoring to identify an indication of the base station, but may perform channel measurement for a downlink of the activated dormant bandwidth part of the cell in the active mode or activated state, and may report measurement information periodically to the base station.

In the above, if the cell, in which the dormant bandwidth part is activated or cell group suspension is indicated, is a PSCell, the UE may not perform PDCCH monitoring or may perform PDCCH monitoring in a very long cycle, or the UE may receive no downlink data, perform channel measurement or measurement result reporting, suspend a configured periodic transmission resource (e.g., type 1 periodic transmission resource (configured uplink grant type 1)), clear or initialize a configured periodic transmission resource (e.g., type 2 periodic transmission resource (configured uplink grant type 2)), transmit a sounding reference signal (SRS), transmit no uplink data, transmit a PUCCH (e.g., scheduling request (SR) or preamble for random access), or perform random access.

In the disclosure, a dormant bandwidth part may indicate a state of a bandwidth part, or may be used as a name of a logical concept indicating a specific bandwidth part. Therefore, a dormant bandwidth part may be activated, deactivated, or switched. For example, an indication to switch an activated second bandwidth part to a dormant bandwidth part in a first cell, an indication to shift the first cell to a dormant state or a dormant mode, or an indication to activate the dormant bandwidth part of the first cell may be interpreted in the same way.

In the disclosure, a normal bandwidth part (or a bandwidth part marked as a bandwidth part without additional description) may indicate bandwidth parts other than a dormant bandwidth part among bandwidth parts configured to the UE for each cell via an RRC message, wherein, in the normal bandwidth part, the UE may exchange uplink or downlink data with the base station, perform PDCCH monitoring to identify an indication of the base station, perform channel measurement for a downlink and periodically report measurement information to the base station, and periodically transmit a pilot signal (sounding reference signal (SRS)) to the base station so that the base station is able to perform uplink channel measurement. The normal bandwidth part may indicate a first active bandwidth part, a default bandwidth part, a first active bandwidth part activated from dormancy, or an initial bandwidth part.

Among the bandwidth parts configured to the UE for each cell, up to one dormant bandwidth part may be configured, but multiple dormant bandwidth parts can be configured, and a dormant bandwidth part may be configured only for a downlink. As another method, one dormant bandwidth part may be configured for an uplink or a downlink among the bandwidth parts configured to the UE for each cell.

In the disclosure, a state of a cell group may be configured to be activated, suspended, or deactivated. The state of the cell group may be indicated by an indicator or a bitmap of DCI of a PDCCH, may be indicated via MAC control information, or may be indicated by an indicator of an RRC message. If the state of the cell group is indicated to be active, configuration information of the cell group, which is configured or indicated via an RRC message (e.g., an RRCReconfiguration message, an RRCSetup message, or an RRCResume message), may be stored and applied in the UE, or may be restored or resumed, and the UE may perform PDCCH monitoring according to the configuration of the RRC message in a PCell, PSCell, or configured SCell of the cell group, receive downlink data, perform channel measurement or measurement result reporting, resume a configured periodic transmission resource (e.g., type 1 periodic transmission resource (configured uplink grant type 1)), configure or activate a configured periodic transmission resource (e.g., type 2 periodic transmission resource (configured uplink grant type 2)), transmit a sounding reference signal (SRS), transmit uplink data, transmit a PUCCH (e.g., scheduling request (SR) or preamble for random access), or perform random access.

If the state of the cell group is indicated to be suspended (suspended state) or deactivated, configuration information of the cell group, which is configured or indicated via an RRC message (e.g., an RRCReconfiguration message, an RRCSetup message, or an RRCResume message), may be stored in the UE, or the configuration information may be not discarded but application thereof to the UE may be suspended, and in a PCell, PSCell, or configured SCell of the cell group, according to the configuration of the RRC message, the UE may not perform PDCCH monitoring or may perform PDCCH monitoring in a very long cycle, or the UE may receive no downlink data, perform channel measurement or measurement result reporting, suspend a configured periodic transmission resource (e.g., type 1 periodic transmission resource (configured uplink grant type 1)), clear or initialize a configured periodic transmission resource (e.g., type 2 periodic transmission resource (configured uplink grant type 2)), transmit a sounding reference signal (SRS), transmit no uplink data, transmit a PUCCH (e.g., scheduling request (SR) or preamble for random access), or perform random access.

In an embodiment, if the state of the cell group is indicated to be deactivated, or clearing of the cell group configuration information is indicated, the UE may clear or discard the cell group configuration information configured or indicated via the RRC message (e.g., an RRCReconfiguration message, an RRCSetup message, or an RRCResume message). In an embodiment, the RRC message (an RRCSetup message, an RRCResume message, or an RRCReconfiguration message) may include cell group configuration information. The cell group configuration information may include some or multiple pieces of information of the following information, or may indicate a state, a procedure, application or clearing of configuration information, or the like for each cell group.

Cell group identifier indicating a cell group (e.g., a cell group identifier or index)

Indicator indicating a state of a cell group (e.g., an active state, a suspended state, or an inactive state)

Indicator indicating a state of a cell group (e.g., an indicator (e.g., an SCG suspension indicator) indicating to suspend (or deactivate) a cell group, or an indicator (e.g., an SCG resumption indicator) indicating to resume (or activate) a cell group)

Indicator for triggering a procedure of a corresponding protocol layer device (e.g., an SDAP layer device, a PDCP layer device, an RLC layer device, or a MAC layer device) according to the indicator indicating a state of a cell group (e.g., a PDCP re-establishment indicator, a PDCP data recovery indicator, an indicator triggering a new procedure, an RLC re-establishment indicator, a MAC layer device initialization indicator, or a MAC layer device partial initialization indicator)

When an indicator indicating to suspend (or deactivate) a state of a cell group is included, second DRX configuration information (e.g., monitoring period or active period (on duration) length, cycle, offset, or the like) which enables PDCCH monitoring to be performed with a very long cycle in a PSCell of the cell group may be configured.

For example, if the UE receives an indicator indicating to suspend a cell group in the above, the UE may perform PDCCH monitoring based on a very long cycle by applying the second DRX configuration information, so as to save power of the UE. As another method, if the UE receives an indicator indicating to suspend the cell group, the UE may, by applying bandwidth part configuration information for the PSCell of the cell group, activate or switch a downlink bandwidth part of the PSCell of the cell group to a dormant bandwidth part, and may perform UE operations, proposed in the disclosure, in a cell in which a dormant bandwidth part is activated.

In an embodiment, if the UE receives the indicator indicating to suspend the cell group, the UE may deactivate all SCells configured in the cell group. In an embodiment, if the UE receives the indicator indicating to suspend the cell group, the UE may activate or switch a downlink bandwidth part to a dormant bandwidth part with respect to an SCell, in which a dormant bandwidth part is configured, among the SCells configured in the cell group, and may perform UE operations in a cell in which a dormant bandwidth part is activated, which are proposed in the disclosure, or may perform deactivation for an SCell in which a dormant bandwidth part is not configured. As another method, if the UE receives, via the RRC message, an indicator indicating to suspend the cell group, the UE may, according to the indicator or configuration information for each SCell of the cell group, which is included in the RRC message, activate or deactivate each SCell, make each SCell dormant, or activate a dormant bandwidth part, or the UE may activate or deactivate each SCell of the cell group, make the each SCell dormant, or activate a dormant bandwidth part, via the indicator (e.g., bitmap) of PDCCH, the MAC control information, or the RRC message before or after reception of the indicator indicating to suspend the cell group.

Configuration information relating to a transmission resource in which channel measurement is performed and a measurement result is reported, in a dormant bandwidth part or in a bandwidth part other than the dormant bandwidth part (e.g., PUCCH transmission resource information of PCell, PUCCH SCell, or PSCell)

If an indicator indicating to resume (activate) a state of a cell group is included, first DRX configuration information (e.g., monitoring period or active period (on duration) length, cycle, offset, or the like) which enables PDCCH monitoring to be performed again in the PSCell of the cell group may be configured. Alternatively, the first DRX configuration information stored for the cell group may be restored and applied. For example, if the UE receives an indicator indicating to resume the cell group, the UE may perform PDCCH monitoring by applying the stored first DRX configuration information or the first DRX configuration information received via the RRC message, thereby resuming data transmission or reception.

In an embodiment, if the UE receives the indicator indicating to resume the cell group, the UE may activate or switch a downlink bandwidth part of the PSCell of the cell group to a bandwidth part (e.g., a bandwidth part configured via an RRC message) other than a dormant bandwidth part, by applying bandwidth part configuration information for the PSCell of the cell group, and may perform UE operations in a cell in which a normal bandwidth part (a bandwidth part other than a dormant bandwidth part) is activated, which are proposed in the disclosure. Alternatively, if the UE receives an indicator indicating to resume the cell group, the UE may trigger random access in the PSCell of the cell group by applying random-access configuration information (random-access transmission resource information (time or frequency transmission resource) for preamble transmission, designated preamble information, or the like) which is stored or received via the RRC message.

In an embodiment, when the UE receives the indicator indicating to resume the cell group, if the RRC message includes random-access configuration information (random-access transmission resource information (time or frequency transmission resource) for preamble transmission, designated preamble information, or the like), the UE may trigger random access (e.g., contention-free random access) in the PSCell of the cell group by applying the random-access configuration information. If the RRC message indicating resumption or activation of the cell group does not include random-access configuration information (random-access transmission resource information (time or frequency transmission resource) for preamble transmission, designated preamble information, or the like), random access (e.g., contention-based random access) may be triggered in the PSCell of the cell group, or random-access (e.g., contention-based random access or 2-step random access) may be triggered based on system information.

In an embodiment, if there is random-access configuration information (random-access transmission resource information (time or frequency transmission resource) for preamble transmission, designated preamble information, or the like) stored in the UE before reception of the indicator indicating to resume the cell group, the stored random-access configuration information may be cleared or discarded. As another method, the UE may perform PDCCH monitoring in the indicated or configured cell group or cell, and may trigger and perform random access as indicated in the PDCCH.

In the above, if an indicator indicating to resume (activate) a state of a cell group is included, or if the UE receives an indicator indicating to resume a cell group, all SCells configured in the cell group may be activated. In an embodiment, if the UE receives the indicator indicating to resume the cell group, the UE may activate or switch a downlink bandwidth part to a bandwidth part (e.g., first active bandwidth part or bandwidth part configured via an RRC message) other than a dormant bandwidth part with respect to an SCell, in which a dormant bandwidth part is configured, among the SCells configured in the cell group, and may perform UE operations in a cell in which a bandwidth part other than a dormant bandwidth part is activated, which are proposed in the disclosure, or may perform activation for an SCell in which a dormant bandwidth part is not configured.

In an embodiment, when UE receives the indicator indicating to resume the cell group via the RRC message, the UE may activate or deactivate each SCell, make each SCell dormant, or activate a dormant bandwidth part according to the indicator or configuration information for each SCell of the cell group, which is included in the RRC message. In an embodiment, before or after reception of the indicator indicating to resume the cell group, the UE may activate or deactivate each SCell of the cell group, make each SCell dormant, or activate a dormant bandwidth part, via the indicator (e.g., bitmap) of PDCCH, the MAC control information, or the RRC message.

Indicator for adding cell group configuration
Indicator for clearing cell group configuration
Security configuration information (security key information, security key information for a cell group, or additional information (e.g., sk-counter))
Indicator indicating handover, adding cell group, or changing cell group (e.g., ReconfigurationWithSync indicator or mobilitycontrolInfo indicator)
First channel measurement configuration information or second channel measurement configuration information for fast cell group or cell activation The RRC message (e.g., an RRCReconfiguration message) may not include, if an indicator for suspension of the cell group is included, an indicator (e.g., an ReconfigurationWithSync indicator or a mobilitycontrolInfo indicator) indicating handover, adding a cell group, or changing a cell group. The message (e.g., an RRCReconfiguration message) may include, if configuration information for configuration or an indicator for resumption of the cell group is included, an indicator (e.g., an ReconfigurationWithSync indicator or a mobilitycontrolInfo indicator) indicating handover, adding a cell group, or changing a cell group. This is because, when the cell group is resumed, the UE needs to make a connection to the cell group again so as to perform synchronization, receive system information, or perform random access when necessary.

As described above, when the basic RRC connection establishment is completed, the base station may transmit, to the UE, an RRC message (UECapabilityEnquiry) to inquire about capability of the UE, so as to identify the capability of the UE (UE capability). In an embodiment, the base station may inquire about the capability of the UE to an MME or an AMF so as to identify the capability of the UE. This is because, if the UE had been previously connected, the MME or the AMF may have stored capability information of the UE. If the MME or the AMF has no UE capability information desired by the base station, or the base station is unable to acquire the same, the base station may request UE capability from the UE.

In an embodiment, when reporting the UE capability, the UE may report, as the UE capability to the base station, whether the UE supports a dormant bandwidth part for an SCell of each cell group (master cell group or secondary cell group), whether the UE supports a dormant bandwidth part for a PSCell of the cell group, or whether the UE supports cell group suspension or resumption for the PSCell and/or SCell of each cell group, the number of supporting cell groups, or the like. In the above, the UE may also report, as the UE capability to the base station, whether configuration information of an SCell of a master cell group, an SCell of a secondary cell group, or a PSCell of a secondary cell group can be stored, restored, discarded, partially reconfigured, or activated via an RRCResume message during RRC connection resumption.

In a base station and a UE supporting and using dual-connectivity (DC) or multi-connectivity (MC), if the UE is configured with one MCG and one or multiple SCGs by using dual-connectivity or multi-connectivity, an uplink transmission power may be determined for each cell group. In an embodiment, if the base station and the UE support cell group suspension or cell group deactivation, and a function therefor is configured, the UE may determine the uplink transmission power for each cell group according to whether another cell group is activated or deactivated, and an activation or deactivation occasion of the cell group.

The UE having received a PDSCH including an MAC CE or an RRC message (activation command) for requesting activation of an SCell or SCG in slot n from the base station may perform at least one of the following actions for the activation-requested serving cell in a time period from a slot just after slot (n+k) to a slot just before slot (n+k$_{req,1}$).

SRS transmission, CSI reporting, PDCCH monitoring, PDCCH monitoring for the serving cell, and PUCCH transmission (corresponding to a case where PUCCH transmission is configured for the serving cell)

In an embodiment, the UE may perform the following action in slot (n+k).

Reporting CSI for the active serving cell in slot (n+k), or

Performing an action associated with sCellDeactivation-Timer in slot (n+k), or

If the serving cell performing CSI reporting is not active in slot (n+k), CSI reporting may be performed in the most recent slot after activation of the serving cell.

Here, k is k$_1$+3·N$_{slot}^{subframe,\mu}$+1, wherein k$_1$ denotes the number of slots from a PDSCH reception slot to a PUCCH transmission slot for transmission of HARQ-ACK information for a TB received via the PDSCH, and is indicated via a PDSCH-to-HARQ_feedback time indicator field of DCI for scheduling of the PDSCH. N$_{slot}^{subframe,\mu}$ is the number of slots per subframe of SCS configuration μ of PUCCH transmission.

Accordingly, as in the above, when an uplink transmission power is determined for each cell group, the base station and the UE may use at least one of the following methods to accurately determine a time point at which each cell group is activated and a time point at which a transmission power for each cell group is applied.

Method 1: The base station and the UE may apply a transmission power for each cell group from slot n in which the PDSCH is received, the PDSCH including the MAC CE or the RRC message for configuring or requesting activation of the cell or cell group.

Method 2: The base station and the UE may apply the transmission power for each cell group from a minimum processing time (T$_{proc,1}$ or T$_{proc,2}$), which is required to process the PDSCH by the UE, subsequent to slot n, a start time point of the earliest slot subsequent to the time, or the earliest uplink transmission occasion subsequent to the time, wherein the PDSCH including the MAC CE or the RRC message for configuring or requesting activation of the cell or cell group is received in slot n.

Method 3: The base station and the UE may apply the transmission power for each cell group from a minimum processing time (T$_{proc,1}$ or T$_{proc,2}$), which is required to process the PDSCH by the UE, and an additional delay time (T) subsequent to slot n, a start time point of the earliest slot subsequent to the time, or the earliest uplink transmission occasion subsequent to the time, wherein the PDSCH including the MAC CE or the RRC message for configuring or requesting activation of the cell or cell group is received in slot n.

Method 4: The base station and the UE may apply the transmission power for each cell group from a slot subsequent to slot n, for example, slot (n+k), slot (n+k$_1$), or slot (n+k$_{req,1}$), a start time point of the earliest slot subsequent to slot (n+k), slot (n+k$_1$), or slot (n+k$_{req,1}$), or the earliest uplink transmission occasion subsequent to the time, wherein the PDSCH including the MAC CE or the RRC message for configuring or requesting activation of the cell or cell group is received in slot n.

EN-DC (E-UTRA-NR Dual Connectivity)

Descriptions are provided for a case where the UE is configured with an MCG and one or multiple SCGs, wherein the MCG uses E-UTRA or LTE radio access and the SCGs use NR radio access, in other words, the UE operating via EN-DC (or EN-MC) is described. In EN-DC/MC, for example, the MCG may use E-UTRA or LTE radio access, SCG #0 may use NR radio access in a first frequency band (frequency range 1 (FR1)) (e.g., a band of 7.125 GHz or lower), and SCG #1 may use NR radio access in a second frequency band (frequency range 2 (FR2)) (e.g., a band of 51.6 GHz or lower).

The UE may be configured with the maximum transmission power p$_{LTE}^{MCG}$ of the MCG via higher layer signaling (e.g., p-MaxEUTRA), and may be configured with the maximum transmit power p$_{NR}^{SCG\_i}$ for the SCG in each of the first frequency band (FR1) and/or the second frequency band (FR2) via higher layer signaling (e.g., p-NR-FR1). In an embodiment, it is also possible for the UE to be configured with the maximum transmission power for all SCGs. The UE may determine an uplink transmission power of the MCG by using the configured maximum transmission power p$_{LTE}^{MCG}$ of the MCG, and may determine an uplink transmission power of the SCG by using the maximum transmission power of each SCG (SCG #i) or the maximum transmission power p$_{NR}^{SCG}$ of all SCGs. Where i=1 or 2.

For the UE configured with $\beta_{LTE}^{MCG}+\Sigma_{i=0}^{N-1}\beta_{NR}^{SCG,i}>\beta_{total}^{EN-DC}$, the uplink transmission power of the SCG may be determined according to at least one of the following. Here, $\hat{P}_{LTE}^{MCG}$, $\hat{P}_{NR}^{SCG,i}$, and $\hat{P}_{total}^{EN-DC}$ are linear values for maximum transmission power values configured for $\hat{P}_{LTE}^{MCG}$, $\hat{P}_{NR}^{SCG,i}$, and EN-DC operation, respectively. N is the number of SCGs configured to the UE.

Hereinafter, in the disclosure, a case of N=1 will be described for convenience of descriptions, but it is obvious that operations of the embodiments proposed in the disclosure are applicable even when N>1.

1-1> If the UE is provided with a reference TDD configuration for E-UTRA or the MCG, 2> If the UE does not have the capability of dynamic power sharing between E-UTRA and NR (or dynamic power sharing between the MCG and the SCG), or if the UE does not indicate such capability information to the base station, The UE may not perform uplink transmission in an SCG slot in an uplink subframe duration or time according to the reference TDD configuration configured for the MCG. In other words, the UE may perform uplink transmission in an SCG slot of FR1 only in a downlink subframe (or special subframe) duration or time according to the reference TDD configuration configured for the MCG. In an embodiment, if the base station requests or indicates the SCG to be activated, or if the SCG is being activated, or if the transmission power for the SCG is determined by at least one or a combination of methods 1 to 4, the UE may perform uplink transmission in the SCG even in a partial time of the uplink subframe duration or time according to the reference TDD configuration configured for the MCG. For example, when transmitting HARQ-ACK information for the SCG activation request to the base station via a PUCCH or a PUSCH, the UE may perform uplink transmission including the HARQ-ACK information in the SCG even in the MCG uplink subframe duration. In an embodiment, the UE may not perform uplink transmission in the MCG in a symbol or slot overlapping with that for uplink transmission in the SCG. In an embodiment, the transmission power of the PUCCH or PUSCH for transmitting the HARQ-ACK information may be determined using the maximum transmission power value configured for the SCG, or may be calculated using a total maximum power available to the UE at the time of the uplink transmission.

1-2> In the case where the UE has the capability of dynamic power sharing between E-UTRA and NR (or dynamic power sharing between the MCG and the SCG) (or if such a capability IE is indicated to the base station), if uplink transmission in subframe $i_1$ of the MCG overlaps in time with SCG slot $i_2$ of FR1, and the condition of $\hat{P}_{MCG}(i_1)+\hat{P}_{SCG}(i_2) > \hat{P}_{Total}^{EN\text{-}DC}$ is satisfied in any time or part of slot $i_2$, the UE may reduce the uplink transmission power in slot $i_2$ of the SCG so that $\hat{P}_{MCG}(i_1)+\hat{P}_{SCG}(i_2 \leq \hat{P}_{Total}^{EN\text{-}DC}$ in any time or part of slot $i_2$, and may perform uplink transmission in the SCG by using the reduced uplink transmission power. If the uplink transmission power to be reduced to satisfy $\hat{P}_{MCG}(i_1)+\hat{P}_{SCG}(i_2) \leq \hat{P}_{Total}^{EN\text{-}DC}$ is greater than a threshold value (e.g., $X_{SCALE}$) defined in advance or configured via higher layer signaling, the UE may not perform uplink transmission in the SCG. Here, $\hat{P}_{MCG}(i_1)$ and $\hat{P}_{SCG}(i_2)$ are linear values of the total uplink transmission power of the UE in subframe $i_1$ of the MCG and slot $i_2$ of the SCG.

In an embodiment, if the base station requests or indicates the SCG to be activated, or if the SCG is being activated, or if the transmission power for the SCG is determined by at least one or a combination of methods 1 to 4, the UE may transmit HARQ-ACK information for the SCG activation request to the base station via the PUCCH or PUSCH. In this way, when uplink transmission (e.g., HARQ-ACK information for the SCG activation request) in the SCG is required during the SCG activation, the UE may perform uplink transmission including the HARQ-ACK information without reducing the uplink transmission power in the SCG. In an embodiment, the uplink transmission power may be reduced for the MCG so as to satisfy $\hat{P}_{MCG}(i_1)+\hat{P}_{SCG}(i_2) \leq \hat{P}_{Total}^{EN\text{-}DC}$, but it may be determined not to perform uplink transmission in the MCG.

NE-DC (NR-E-UTRA Dual Connectivity)

Descriptions are provided for a case where the UE is configured with an MCG and one or multiple SCGs, wherein the MCG uses NR radio access and the SCGs use E-UTRA or LTE radio access and/or NR radio access, in other words, the UE operating via NE-DC or NE-MC is described.

The UE may be configured with the maximum transmission power $P_{NR}^{MCG}$ for the MCG in a first frequency band (frequency range 1 (FR1)) via higher layer signaling (e.g., p-NR-FR1), and may be configured with the maximum transmission power ($P_{LTE}^{SCG\_i}$ and $P_{NR}^{SCG\_j}$) of the SCG or the maximum transmission power $P_{total}^{SCG}$ configured for all SCGs via higher layer signaling (e.g., p-MaxEUTRA). The UE may determine an uplink transmission power of the MCG by using the configured maximum transmission power $P_{NR}^{MCG}$ of the MCG, and may determine an uplink transmission power of each SCG by using the maximum transmission power ($P_{LTE}^{SCG\_i}$ and $\hat{P}_{NR}^{SCG\_j}$) of the SCG, or may determine an uplink transmission power of the SCG by using the maximum transmission power $P_{total}^{SCG}$ of all SCGs. If the UE fails to receive TDD uplink and downlink common configuration information (e.g., tdd-UL-DL-ConfigurationCommon) for the MCG, the UE may determine a transmission power for the SCG, as follows, by using $P_{LTE}^{SCG\_i}$ or $P_{NR}^{SCG\_j}$ as the maximum transmission power.

In the following description, for convenience of description, it will be assumed that the UE is configured with one SCG, and the SCG uses E-UTRA or LTE radio access, but it is obvious that operations of the embodiments proposed in the disclosure are applicable even when multiple SCGs are provided and at least one of the SCGs uses NR radio access.

1-1> If at least one symbol of slot ii of the MCG is indicated to be an uplink symbol or a flexible symbol via TDD uplink and downlink configuration information (e.g., tdd-UL-DL-ConfigurationCommon or e.g., tdd-UL-DL-ConfigurationDedicated) provided via higher layer signaling, and the symbol overlaps subframe $i_2$ of the SCG, 2> The UE may determine a transmission power in the SCG by using $P_{LTE}^{SCG}$ or $P_{NR}^{SCG}$ as the maximum transmission power in subframe $i_2$.

1-2> If otherwise in 1-1>,

2> The UE may determine the transmission power in the SCG without considering $P_{LTE}^{SCG}$ or $P_{NR}^{SCG}$ as the maximum transmission power.

In an embodiment, if the base station requests or indicates the SCG to be activated, or if the SCG is being activated, or if the transmission power for the SCG is determined by at least one or a combination of methods 1 to 4, the UE may perform uplink transmission in the SCG even in a partial time of the uplink subframe duration or time according to the reference TDD configuration configured for the MCG. For example, when transmitting HARQ-ACK information for the SCG activation request to the base station via a PUCCH or a PUSCH, the UE may perform the uplink transmission in the SCG even in the MCG uplink subframe duration. In an embodiment, the UE may not perform uplink transmission in the MCG in a symbol or slot overlapping with that for uplink transmission in the SCG. In an embodiment, the transmission power of the PUCCH or PUSCH for transmitting the HARQ-ACK information may be determined using the maximum transmission power value configured for the SCG, or may be calculated based on a total maximum power available to the UE at the time of the uplink transmission.

If the sum of $\hat{P}_{LTE}$ and $\hat{P}_{NR}$, which the base station configures for the UE via higher layer signaling, is greater than $\hat{P}_{Total}^{NE\text{-}DC}$, that is, if $\hat{P}_{LTE}+\hat{P}_{NR} > \hat{P}_{Total}^{NE\text{-}DC}$, the UE may determine a transmission power of the MCG as follows. Here, $\hat{P}_{LTE}$ and $\hat{P}_{NR}$ are linear values of $P_{LTE}$ and $P_{NR}$, and $\hat{P}_{LTE}$ and $\hat{P}_{NR}$ are $\hat{P}_{LTE}^{SCG}$ and $\hat{P}_{NR}^{MCG}$, $\hat{P}_{Total}^{NE\text{-}DC}$ is a linear value of the maximum transmission power configured for NE-DC operation in the first frequency domain.

1-1> If the UE is configured with a reference TDD configuration (e.g., tdm-PatternConfig-r15) for E-UTRA or the SCG, 2> If the UE does not have the capability of dynamic power sharing between E-UTRA and NR (or dynamic power sharing between the MCG and the SCG) (or if such capability information is not indicated to the base station), the UE may not perform uplink transmission in an MCG slot of FR1 in an uplink subframe duration or time according to the reference TDD configuration configured for the SCG.

1-2> If the UE has the capability of dynamic power sharing between E-UTRA and NR (or dynamic power sharing between the MCG and the SCG) (or if such capability information is indicated to the base station, 2> If uplink transmission in subframe $i_2$ of the SCG overlaps in time with MCG slot $i_1$ of FR1, and if $\hat{P}_{MCG}(i_1) + \hat{P}_{SCG}(i_2) > \hat{P}_{Total}^{EN-DC}$ in any time or part of slot $i_1$, the UE may reduce the uplink transmission power in slot $i_1$ of the MCG so that $\hat{P}_{MCG}(i_1) + \hat{P}_{SCG}(i_2) \leq \hat{P}_{Total}^{EN-DC}$ in any time or part of slot ii, and may perform uplink transmission in the MCG. Here, $\hat{P}_{MCG}(i_1)$ and $\hat{P}_{SCG}(i_2)$ are linear values of the total uplink transmission power of the UE in slot $i_1$ of the MCG and subframe $i_2$ of the SCG, respectively.

NR-DC (NR-NR Dual Connectivity)

Descriptions are provided for a case where the UE is configured with an MCG and one or multiple SCGs, wherein the MCG and the SCGs both use NR radio access, in other words, the UE connected and operating based on NR-DC or NR-MC is described. In NR-DC/MC, for example, if the MCG uses NR radio access in a first frequency band and SCG #0 uses NR radio access in a second frequency band, SCG #1 may use NR radio access in another frequency band (e.g., 60 GHz).

The UE may independently perform transmission power control for each cell group. The UE may be configured with the maximum transmission power $P_{MCG}$ in the MCG and the maximum transmission power $P_{SCG}$ in the SCG via higher layer signaling (e.g., the cell group setting information in <Table 16>), respectively, and may be configured with a power sharing mode between cell groups. The UE may determine a transmission power in the MCG and a transmission power in the SCG in units of frequency domains (e.g., FR1 or FR2).

If the UE is provided or configured with one of a first semi-static power sharing mode (semi-static-mode1) or a second semi-static power sharing mode (semi-static-mode2) via higher layer signaling, the UE may be configured so that $P_{MCG}$ and $P_{SCG,i}$ do not satisfy $\hat{P}_{MCG} + \Sigma_{i=0}^{i=N-1} \hat{P}_{SCG,i} > \hat{P}_{Total}^{NR-DC}$. Here, $\hat{P}_{MCG}$, $\hat{P}_{SCG,i}$, and $\hat{P}_{Total}^{NR-DC}$ are linear values of the maximum transmission power configured for $P_{MCG}$, $P_{SCG}$, and NR-MC operations, respectively. Hereinafter, for convenience of description, it is assumed that the UE is configured with one SCG, that is, N=1.

If the UE is provided or configured with the first semi-static power sharing mode (semi-static-mode1) as a power sharing mode, the UE may determine the uplink transmission power in the MCG and the SCG, as follows, by using the $P_{MCG}$ and $P_{SCG}$ as the maximum transmission power of the MCG and the SCG, respectively.

1> If the UE is provided or configured with the second semi-static power sharing mode (semi-static-mode2) as a power sharing mode, 2-1> If at least one symbol in slot ii of MCG is indicated as an uplink symbol or a flexible symbol via higher layer signaling (e.g., tdd-UL-DL-ConfigurationCommon and/or tdd-UL-DL-ConfigurationDedicated), and the symbol overlaps "any ongoing uplink transmission" in slot $i_2$ of the SCG, or if at least one symbol in slot $i_1$ of the SCG is indicated as an uplink symbol or a flexible symbol via higher layer signaling (e.g., tdd-UL-DL-ConfigurationCommon and/or tdd-UL-DL-ConfigurationDedicated), and the symbol overlaps any ongoing uplink transmission in slot $i_2$ of the MCG, 3-1> The UE may determine the uplink transmission power in the MCG and the SCG by using $P_{MCG}$ and $P_{SCG}$ as the maximum transmission power of the MCG and the SCG, respectively.

3-2> If the base station requests or indicates the SCG to be activated, or if the SCG is being activated, or if the transmission power for the SCG is determined by at least one or a combination of methods 1 to 4, the UE may transmit HARQ-ACK information for the SCG activation request to the base station via the PUCCH or PUSCH. In this case, the UE may determine the uplink transmission power in the MCG and the SCG by using $P_{MCG}$ and $P_{SCG}$ as the maximum transmission power of the MCG and the SCG, respectively.

3-3> If the base station requests or indicates the SCG to be activated, or if the SCG is being activated, or if the transmission power for the SCG cannot be determined by at least one or a combination of methods 1 to 4, but HARQ-ACK information for the SCG activation request, etc. needs to be transmitted to the base station via the PUCCH or PUSCH, the UE may determine the transmission power for the SCG by using $\hat{P}_{Total}^{NR-DC}$ as the maximum transmission power and may not transmit the MCG, or the UE may determine the transmission power of the MCG by using the remaining available power after determining the transmission power of the SCG.

2-2> If otherwise in 2-1>,

The UE may determine the uplink transmission power in the MCG or the SCG, overlapped with slot $i_2$, without considering $P_{MCG}$ and $P_{SCG}$. In an embodiment, the SCG may be an SCG which is a previously activated cell group or may refer to an SCG after a case where the base station requests or indicates the SCG to be activated, a case where the SCG is being activated, or a case where the transmission power for the SCG is determined by at least one or a combination of methods 1 to 4.

If the UE is provided or configured with a dynamic power sharing mode, the UE may have the capability of determining the transmission power of all SCGs in a first symbol of an SCG transmission occasion by transmission in the MCG, or may indicate such capability information to the base station. In an embodiment, the transmission in the MCG may be configured via higher layer signaling or may overlap transmission in the SCG, and the first symbol of the SCG transmission occasion may be located at least a $T_{offset}$ time after the last symbol in which DCI for scheduling of the transmission in the MCG is received. In other words, in this case, the last symbol in which DCI for scheduling of the transmission in the MCG is received may be the $T_{offset}$ time before the first symbol of the SCG transmission occasion.

In the case above, the UE may determine the total maximum transmission power of the SCG at a start time point of SCG transmission, as follows.

If the UE determines the total transmission power in the MCG as $\hat{P}_{MCG}^{actual}$, the total maximum transmission power of the SCG may be determined to be $\min(\hat{P}_{SCG}, \hat{P}_{Total}^{NR-DC} - \hat{P}_{MCG}^{actual})$.

If the UE does not determine any transmission in the MCG, the total maximum transmission power of the SCG may be determined to be $\hat{P}_{Total}^{NR-DC}$.

If the UE is requested or indicated to activate at least one SCG, or if the SCG is being activated, or if the transmission power for the SCG is determined by at least one or a combination of methods 1 to 4, and the UE transmits HARQ-ACK information for the SCG activation request, etc. to the base station via the PUCCH or PUSCH, the maximum transmission power of the SCG at the start time point of the SCG transmission occasion may be determined to be $\hat{P}_{SCG}^{actual}$ according to $\hat{P}_{SCG}$. The total transmission power of the MCG may be determined to be $(\hat{P}_{MCG}, \hat{P}_{Total}^{NR\text{-}DC} - \hat{P}_{SCG}^{actual})$.

If the UE is requested or indicated to activate at least one SCG, or if the SCG is being activated, or if the transmission power for the SCG cannot be determined by at least one or a combination of methods 1 to 4, but HARQ-ACK information for the SCG activation request, etc. needs to be transmitted to the base station via the PUCCH or PUSCH, the maximum transmission power of the SCG at the start time point of the SCG transmission occasion may be determined according to $\hat{P}_{Total}^{NR\text{-}DC}$. Uplink transmission in the MCG may not be performed, or the total transmission power of the MCG may be determined to be $(\hat{P}_{MCG}, \hat{P}_{Total}^{NR\text{-}DC} - \hat{P}_{SCG}^{actual})$ in consideration of an actual transmission power in the SCG.

Here, $\hat{P}_{MCG}^{actual}$ and $\hat{P}_{SCG}^{actual}$ are the total power for uplink transmission satisfying the conditions above in the MCG and the SCG, respectively, $T_{offset}$ is max $\{T_{proc,MCG}^{max}, T_{proc,SCG}^{max}\}$, and $T_{proc,MCG}^{max}$ and $T_{proc,SCG}^{max}$ are the maximum values of all or some (e.g., $T_{proc,2}, T_{proc,release}^{mux}$, and $T_{proc,2}^{mux}$) of the processing times (e.g., $T_{proc,2}, T_{proc,CSI}, T_{proc,release}^{mux}, T_{proc,2}^{mux}$, and $T_{proc,CSI}^{mux}$) of the UE, which are configured for the MCG and the SCG.

If transmission in the MCG overlaps at least partially with the transmission occasion in the SCG, an uplink TPC command value greater than 0 (positive) may be used for the UE to determine the transmission power of the MCG and/or the SCG when the last symbol, in which DCI indicating the TPC command value is received, is $T_{offset}$ before a first symbol start time of the SCG transmission occasion. Otherwise, the UE may determine the transmission power of the MCG and/or the SCG while disregarding or not applying the TPC command value, or may not perform uplink transmission of at least one of the MCG and/or the SCG.

Figure 13:
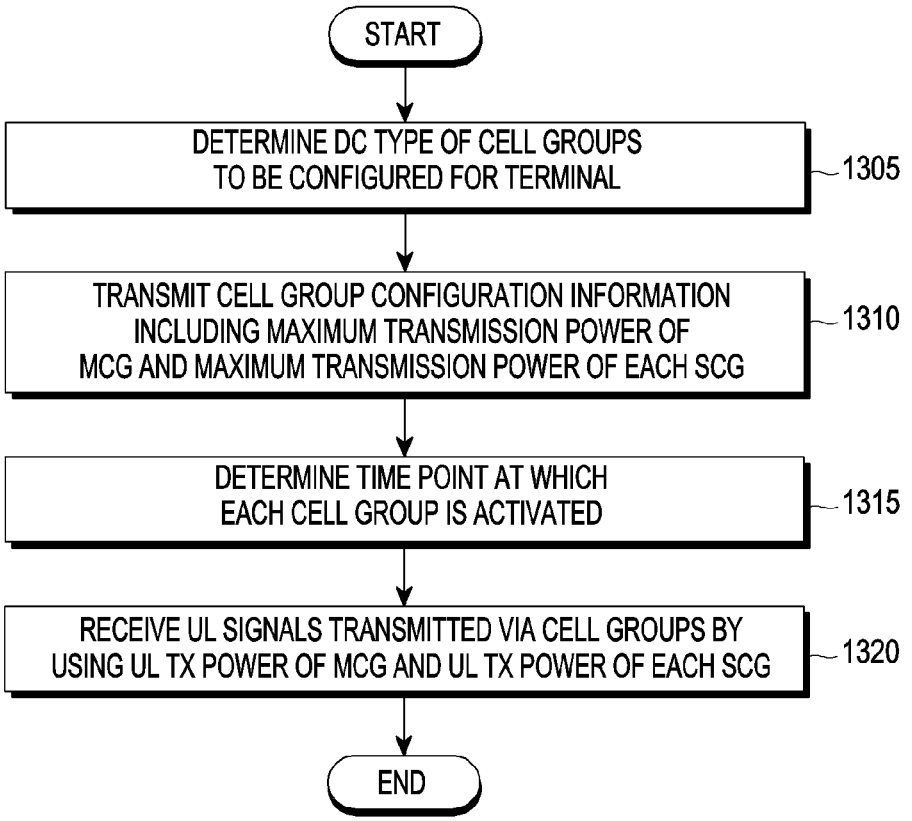
FIG. 13 is a flowchart illustrating an operation of a base station for configuring an uplink transmission power for each cell group according to an embodiment of the disclosure.

FIG. 13 is a flowchart illustrating a procedure for configuring UL power control of a UE by a base station according to an embodiment of the disclosure.

Referring to FIG. 13, in operation 1305, a base station may determine DC or MC (hereinafter, referred to as DC/MC) types of cell groups to be configured to a UE. The DC/MC type may be one of EN-DC, NE-DC, and NR-DC described above. The base station may identify the DC/MC type according to a radio access technology and a frequency band of each cell group configured to the UE. For example, the base station may identify the DC/MC type of multi-connectivity for the UE according to a cell group already configured to the UE and a cell group to be additionally configured.

In operation 1310, the base station may transmit cell group configuration information including the maximum transmission power of an MCG and the maximum transmission power of each SCG to the UE via higher layer signaling. The cell group configuration information may include at least one of parameters related to power control for each MCG and each SCG described above. For example, the cell group configuration information may indicate at least one of the maximum transmission power of the MCG, the total maximum transmission power of the SCG, the maximum transmission power of each SCG, the maximum transmission power for EN-DC operation, the maximum transmission power for NE-DC operation, and an uplink power sharing mode.

In operation 1315, the base station may determine a time point at which each cell group is activated for each of multiple cell groups configured to the UE, according to, for example, at least one of method 1 to method 4 described above, and in operation 1320, the base station may receive, at the determined each time point, an MCG uplink signal transmitted from the UE at the uplink transmission power for the MCG or an SCG uplink signal transmitted from the UE at the uplink transmission power for each SCG.

Figure 14:
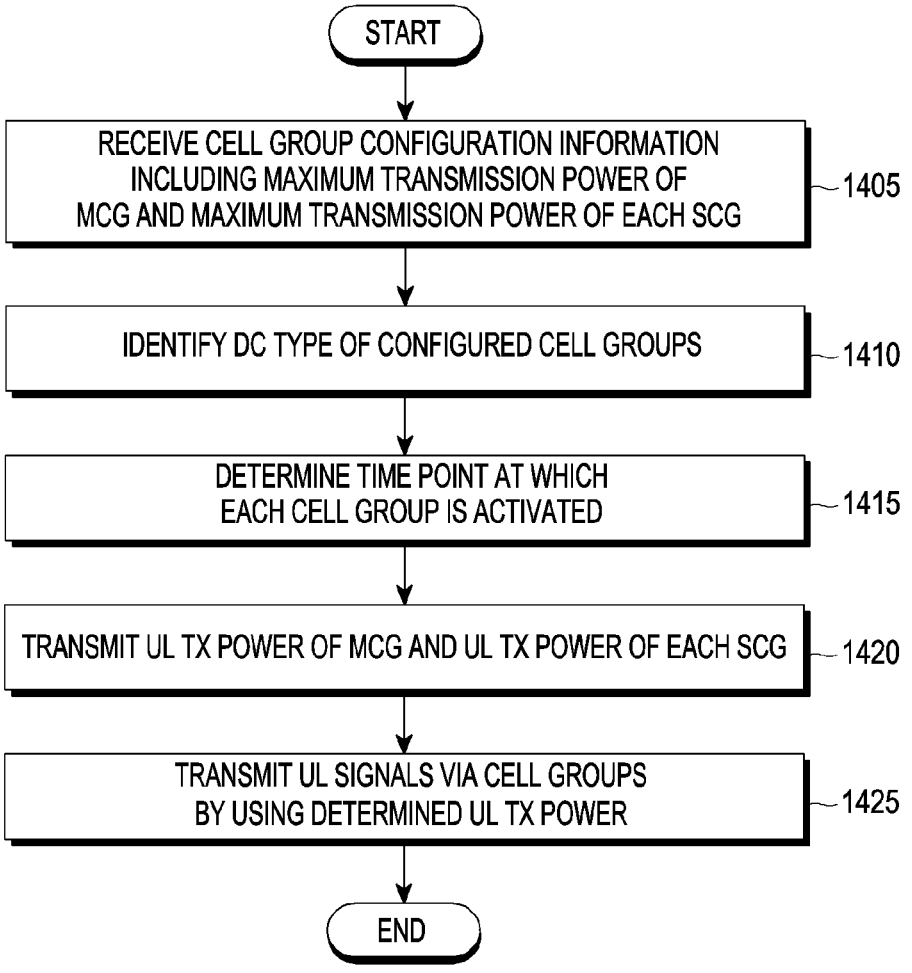
FIG. 14 is a flowchart illustrating an operation of a user equipment for configuring an uplink transmission power for each cell group according to an embodiment of the disclosure.

FIG. 14 is a flowchart illustrating a procedure for determining uplink transmission power of a UE according to an embodiment of the disclosure.

Referring to FIG. 14, in operation 1405, a UE may receive cell group configuration information from a base station via higher layer signaling. The cell group configuration information may include at least one of parameters related to power control for each MCG and each SCG described above. For example, the cell group configuration information may configure at least one of the maximum transmission power of the MCG, the total maximum transmission power of the SCG, the maximum transmission power of each SCG, and a power sharing mode.

In operation 1410, the UE identifies DC types of cell groups configured by the cell group configuration information. The DC/MC type may be one of EN-DC, NE-DC, and NR-DC described above. The UE may identify the DC/MC type according to a radio access technology and a frequency band of each cell group configured for by the base station. For example, the UE may identify the DC/MC type of multi-connectivity according to a previously configured cell group and a cell group to be additionally configured.

In operation 1415, the UE may determine a time point at which each cell group is activated for each of multiple cell groups configured by the base station, according to, for example, at least one of method 1 to method 4 described above, and in operation 1420, the UE may determine an uplink transmission power of the MCG and an uplink transmission power of each SCG, which are to be applied at the determined time point. In operation 1425, the UE may transmit uplink signals via the cell groups by using the determined uplink transmission power of each cell group at the determined time point.

The above-described embodiments of the disclosure are not alternatives to each other, and one or more methods may be used in combination. Methods disclosed in the claims and/or methods according to the embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random-access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the disclosure, the term "computer program product" or "computer readable medium" is used to generally refer to a medium such as a memory, a hard disk installed in a hard disk drive, or a signal. The "computer program product" or "computer readable medium" is a means that is provided to a method for monitoring a downlink control channel in a wireless communication system according to the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a UE. Furthermore, the embodiments of the disclosure may also be applied to other communication systems, and other variants based on the technical idea of the embodiments may also be implemented. For example, the embodiments may be applied to LTE, 5G, or NR systems.

The invention claimed is:

1. A method of a user equipment (UE) for performing uplink power control for multi-connectivity in a wireless communication system, the method comprising:

receiving, from a base station, cell group configuration information related to a master cell group (MCG) and one or more secondary cell groups (SCGs) among multiple cell groups configured to the UE, wherein the cell group configuration information indicates each of a maximum transmission power of the MCG and a maximum transmission power of each of the SCGs;

transmitting, to the base station via the MCG and the SCGs, uplink signals having a transmission power of the MCG and a transmission power of each SCG, based on the maximum transmission power of the MCG and the maximum transmission power of each of the SCGs, respectively, and a multi-connectivity type of the multiple cell groups; and in case that the multi-connectivity type is NR-EUTRA dual connectivity (NE-DC) comprising the MCG using NR and each of the SCGs using EUTRA or at least one of long term evolution or the NR:

in case that at least one first symbol of a first slot of the MCG is an uplink symbol or a flexible symbol based on a time division duplex (TDD) configuration for the MCG and the at least one first symbol of the first slot of the MCG overlaps with a first subframe of a first SCG, determining an uplink transmission power for the first SCG based on a maximum transmission power configured for the first SCG;

in case that at least one first symbol of the first slot of the MCG is a downlink symbol based on the TDD configuration configured for the MCG or the at least one first symbol of the first slot of the MCG does not overlap with the first subframe of the first SCG, determining an uplink transmission power for the first SCG regardless of the maximum transmission power configured for the first SCG;

in an uplink subframe based on a reference TDD configuration configured for the MCG, transmitting, to the base station, HARQ-ACK (hybrid automatic repeat request-acknowledgement) information on a request for activating the first SCG based on the determined uplink transmission power; and determining not to perform an uplink transmission on the MCG in a symbol or a slot overlapping with a transmission of the HARQ-ACK information.

2. The method of claim 1, further comprising, in case that the multi-connectivity type is evolved universal terrestrial radio access-new radio (EUTRA-NR) dual connectivity (EN-DC) comprising the MCG using EUTRA and each of the SCGs using NR:

in case that the UE does not have capability of supporting dynamic power sharing between the EUTRA and the NR, determining not to perform the uplink transmission in a slot of the SCGs in an uplink subframe based on a reference time division duplex (TDD) configuration configured for the MCG; and in the uplink subframe based on the reference TDD configuration configured for the MCG, transmitting, to the base station, hybrid automatic repeat request-acknowledgement (HARQ-ACK) information on a request for activating a first SCG to the base station on the first SCG, wherein an uplink transmission power of the UE transmitting the HARQ-ACK information is determined based on a maximum transmission power configured for the first SCG or on a total maximum power available to the UE at a time instance when the UE transmits the HARQ-ACK information.

3. The method of claim 1, further comprising, in case that the multi-connectivity type is EUTRA-NR dual connectivity (EN-DC) comprising the MCG using EUTRA and each of the SCGs using NR:

in case that the UE is capable of supporting dynamic power sharing between the EUTRA and the NR, in case that the uplink transmission in a first subframe of the MCG overlaps in a time with a first slot of a first SCG, and a sum of a linear value of the maximum transmission power of the MCG and a linear value of a maximum transmission power of the first SCG is greater than a total transmission power allowed for the EN-DC in the first slot, reducing an uplink transmission power of the first SCG in the first slot and transmitting an uplink signal having the reduced uplink transmission power on the first SCG; and transmitting HARQ-ACK information on a request for activating the first SCG on the first SCG without power reduction.

4. The method of claim 1, further comprising, in case that the multi-connectivity type is NE-DC comprising the MCG using NR and each of the SCGs using EUTRA or at least one of LTE or the NR:

in case that the UE is not capable of supporting dynamic power sharing between EUTRA and NR, determining not to perform uplink transmission in a slot of the MCG in a period or a time within an uplink subframe based on a reference TDD configuration configured for a first SCG; and in case that the UE is capable of supporting dynamic power sharing between the EUTRA and the NR, in case that uplink transmission in a first subframe of the first SCG overlaps in a time with a first slot of the MCG, and a sum of a linear value of the maximum transmission power of the MCG and a linear value of a maximum transmission power of the first SCG is greater than a total transmission power allowed for NE-DC in the first slot, reducing an uplink transmission power of the MCG in at least one part in the first slot and transmitting an uplink signal having the reduced uplink transmission power on the MCG.

5. The method of claim 1, further comprising, in case that the multi-connectivity type is NR-NR dual connectivity (NR-DC) comprising the MCG using NR and each of the SCGs using the NR:

in case that the UE is configured to be in a first semi-static power sharing mode by the cell group configuration information, determining the transmission power of the MCG and each of the SCGs based on the maximum transmission power of the MCG and the maximum transmission power of each of the SCGs;

in case that the UE is configured to be in a second semi-static power sharing mode by the cell group configuration information, in case that at least one first symbol in a first slot of the MCG is an uplink symbol or a flexible symbol based on a TDD configuration configured for the MCG, and the at least one first symbol in the first slot of the MCG overlaps with an ongoing uplink transmission of a first slot of a first SCG, or at least one second symbol in a third slot of the first SCG is an uplink symbol or a flexible symbol based on a TDD configuration configured for the first SCG, and the second symbol overlaps with an ongoing uplink transmission of a fourth slot of the MCG, determining the transmission power of the MCG and each of the SCGs based on the maximum transmission power of the MCG and the maximum transmission power of each of the SCGs; and transmitting HARQ-ACK information on a request for activating the first SCG on the first SCG.

6. The method of claim 1, further comprising, in case that the multi-connectivity type is NR-DC comprising the MCG using NR and each of the SCGs using the NR, determining an uplink transmission power for a first SCG based on a total transmission power allowed for the NR-DC as a maximum transmission power and transmitting HARQ-ACK information on a request for activating the first SCG based on the determined uplink transmission power.

7. A method of a base station for performing uplink power control for multi-connectivity in a wireless communication system, the method comprising:

transmitting, to a user equipment (UE), cell group configuration information related to a master cell group (MCG) and one or more secondary cell groups (SCGs) among multiple cell groups configured to the UE, wherein the cell group configuration information indicates each of a maximum transmission power of the MCG and a maximum transmission power of each of the SCGs;

receiving, from the UE via the MCG and the SCGs, uplink signals with a transmission power of the MCG and a transmission power of each SCG, based on the maximum transmission power of the MCG and the maximum transmission power of each of the SCGs, respectively, and a multi-connectivity type of the multiple cell groups;

in case that the multi-connectivity type is NR-EUTRA dual connectivity (NE-DC) comprising the MCG using NR and each of the SCGs using EUTRA or at least one of long term evolution or the NR:

in case that at least one first symbol of a first slot of the MCG is an uplink symbol or a flexible symbol based on a TDD (time division duplex) configuration for the MCG and the at least one first symbol of the first slot of the MCG overlaps with a first subframe of a first SCG, determining an uplink transmission power in the first SCG based on a maximum transmission power configured for the first SCG;

in case that at least one first symbol of the first slot of the MCG is a downlink symbol based on the TDD configuration configured for the MCG or the at least one first symbol of the first slot of the MCH does not overlap with the first subframe of the first SCG, determining an uplink transmission power in the first SCG regardless of the maximum transmission power configured for the first SCG;

in an uplink subframe based on a reference TDD configuration configured for the MCG, receiving, from the UE, HARQ-ACK (hybrid automatic repeat request-acknowledgement) information on a request for activating the first SCG based on the determined uplink transmission power; and determining not to perform an uplink transmission on the MCG in a symbol or a slot overlapping with a transmission of the HARQ-ACK information.

8. The method of claim 7, further comprising, in case that the multi-connectivity type is evolved universal terrestrial radio access-new radio (EUTRA-NR) dual connectivity (EN-DC) comprising the MCG using EUTRA and each of the SCGs using NR:

in case that the UE does not have capability of supporting dynamic power sharing between the EUTRA and the NR, determining not to perform the uplink transmission in a slot of the SCGs in an uplink subframe based on a reference time division duplex (TDD) configuration configured for the MCG; and in the uplink subframe based on the reference TDD configuration configured for the MCG, receiving, from the UE, hybrid automatic repeat request-acknowledgement (HARQ-ACK) information on a request for activating a first SCG on the first SCG, wherein an uplink transmission power of the UE transmitting the HARQ-ACK information is determined based on a maximum transmission power configured for the first SCG or on a total maximum power available to the UE at a time instance when the UE transmits the HARQ-ACK information.

9. The method of claim 7, further comprising, in case that the multi-connectivity type is EUTRA-NR dual connectivity (EN-DC) comprising the MCG using EUTRA and each of the SCGs using NR:

in case that the UE is capable of supporting dynamic power sharing between the EUTRA and the NR, in case that the uplink transmission in a first subframe of the MCG overlaps in time with a first slot of a first SCG, and a sum of a linear value of the maximum transmission power of the MCG and a linear value of a maximum transmission power of the first SCG is greater than a total transmission power allowed for the EN-DC in the first slot, receiving an uplink signal having a reduced uplink transmission power in the first slot on the first SCG; and receiving HARQ-ACK information on a request for activating the first SCG on the first SCG without power reduction.

10. The method of claim 7, further comprising, in case that the multi-connectivity type is NE-DC comprising the MCG using NR and each of the SCGs using EUTRA or at least one of LTE or the NR:

in case that the UE is not capable of supporting dynamic power sharing between EUTRA and NR, determining not to perform uplink transmission in a slot of the MCG in a period or a time within an uplink subframe based on a reference TDD configuration configured for a first SCG; and in case that the UE is capable of supporting dynamic power sharing between the EUTRA and the NR, in case that uplink transmission in a first subframe of the first SCG overlaps in time with a first slot of the MCG, and a sum of a linear value of the maximum transmission power of the MCG and a linear value of a maximum transmission power of the first SCG is greater than a total transmission power allowed for NE-DC in the first slot, receiving an uplink signal having a reduced uplink transmission power on the MCG in the first slot.

11. The method of claim 7, further comprising, in case that the multi-connectivity type is NR-NR dual connectivity (NR-DC) comprising the MCG using NR and each of the SCGs using the NR:

in case that the UE is configured to be in a first semi-static power sharing mode by the cell group configuration information, determining the transmission power of the MCG and each of the SCGs based on the maximum transmission power of the MCG and the maximum transmission power of each of the SCGs;

in case that the UE is configured to be in a second semi-static power sharing mode by the cell group configuration information, in case that at least one first symbol in a first slot of the MCG is an uplink symbol or a flexible symbol based on a TDD configuration configured for the MCG, and the at least one first symbol in the first slot of the MCG overlaps with an ongoing uplink transmission of a first slot of a first SCG, or at least one second symbol in a third slot of the first SCG is an uplink symbol or a flexible symbol based on a TDD configuration configured for the first SCG, and the second symbol overlaps with an ongoing uplink transmission of a fourth slot of the MCG, determining the transmission power of the MCG and each of the SCGs based on the maximum transmission power of the MCG and the maximum transmission power of each of the SCGs; and receiving, on the first SCG, HARQ-ACK information on a request for activating the first SCG.

12. The method of claim 7, further comprising, in case that the multi-connectivity type is NR-DC comprising the MCG using NR and each of the SCGs using the NR, receiving, on a first SCG, HARQ-ACK information on a request for activating the first SCG, wherein the HARQ-ACK information is transmitted from the UE based on an uplink transmission power for the first SCG determined using a total transmission power allowed for the NR-DC as a maximum transmit power.

13. A user equipment (UE) for performing uplink power control for multi-connectivity in a wireless communication system, the UE comprising:

a controller; and a transceiver operably coupled to the controller, the transceiver configured to;

receive, from a base station, cell group configuration information related to a master cell group (MCG) and one or more secondary cell groups (SCGs) among multiple cell groups configured to the UE, the cell group configuration information indicating each of a maximum transmission power of the MCG and a maximum transmission power of each of the SCGs, transmit, to the base station via the MCG and the SCGs, uplink signals having a transmission power of the MCG and a transmission power of each SCG, based on the maximum transmission power of the MCG and the maximum transmission power of each of the SCGs, respectively, and a multi-connectivity type of the multiple cell groups, in case that the multi-connectivity type is NR-EUTRA dual connectivity (NE-DC) comprising the MCG using NR and each of the SCGs using EUTRA or at least one of long term evolution or the NR:

in case that at least one first symbol of a first slot of the MCG is an uplink symbol or a flexible symbol based on a TDD (time division duplex) configuration for the MCG and the at least one first symbol of the first slot of the MCG overlaps with a first subframe of a first SCG, determine an uplink transmission power in the first SCG based on a maximum transmission power configured for the first SCG, in case that at least one first symbol of the first slot of the MCG is a downlink symbol based on the TDD configuration configured for the MCG or the at least one first symbol of the first slot of the MCG does not overlap with the first subframe of the first SCG, determine an uplink transmission power in the first SCG regardless the maximum transmission power configured for the first SCG, in an uplink subframe based on a reference TDD configuration configured for the MCG, transmit, to the base station, HARQ-ACK (hybrid automatic repeat request-acknowledgement) information on a request for activating the first SCG based on the determined uplink transmission power, and determine not to perform an uplink transmission on the MCG in a symbol or a slot overlapping with a transmission of the HARQ-ACK information.

14. A base station for performing uplink power control for multi-connectivity in a wireless communication system, the base station comprising:

a controller; and a transceiver operably coupled to the controller, the transceiver configured to:

transmit, to a user equipment (UE), cell group configuration information related to a master cell group (MCG) and one or more secondary cell groups (SCGs) among multiple cell groups configured to the UE, the cell group configuration information indicating each of a maximum transmission power of the MCG and a maximum transmission power of each of the SCGs, wherein the cell group configuration information includes a power sharing mode between cell groups, the power sharing mode comprising at least two modes for an uplink transmission of the UE based on the maximum transmission power of the MCG and the maximum transmission power of each of the SCGs, receive, from the UE via the MCG and the SCGs, uplink signals with a transmission power of the MCG and a transmission power of each SCG, based on the maximum transmission power of the MCG and the maximum transmission power of each of the SCGs, respectively, and a multi-connectivity type of the multiple cell groups, and in case that the multi-connectivity type is NR-EUTRA dual connectivity (NE-DC) comprising the MCG using NR and each of the SCGs using EUTRA or at least one of long term evolution or the NR;

in case that at least one first symbol of a first slot of the MCG is an uplink symbol or a flexible symbol based on a TDD (time division duplex) configuration for the MCG and the at least one first symbol of the first slot of the MCG overlaps with a first subframe of a first SCG, determine an uplink transmission power in the first SCG based on a maximum transmission power configured for the first SCG, in case that at least one first symbol of the first slot of the MCG is a downlink symbol based on the TDD configuration configured for the MCG or the at least one first symbol of the first slot of the MCH does not overlap with the first subframe of the first SCG, determine an uplink transmission power in the first SCG regardless of the maximum transmission power configured for the first SCG, in an uplink subframe based on a reference TDD configuration configured for the MCG, receive, from the UE, HARQ-ACK (hybrid automatic repeat request-acknowledgement) information on a request for activating the first SCG based on the determined uplink transmission power, and determine not to perform an uplink transmission on the MCG in a symbol or a slot overlapping with a transmission of the HARQ-ACK information.

* * * * *